(12) United States Patent
Ballatine et al.

(10) Patent No.: US 8,970,176 B2
(45) Date of Patent: Mar. 3, 2015

(54) DC MICRO-GRID

(75) Inventors: Arne Ballatine, Palo Alto, CA (US);
Chad Pearson, Mountain View, CA (US); Ranganathan Gurunathan, Bangalore (IN); Prasad Pmsvvsv, Bangalore (IN); Alberto Doronzo, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 400 days.

(21) Appl. No.: 13/533,593

(22) Filed: Jun. 26, 2012

(65) Prior Publication Data

US 2012/0267952 A1 Oct. 25, 2012

Related U.S. Application Data

(63) Continuation-in-part of application No. 13/295,527, filed on Nov. 14, 2011.

(60) Provisional application No. 61/501,604, filed on Jun. 27, 2011, provisional application No. 61/413,629, filed on Nov. 15, 2010.

(51) Int. Cl.
*H02J 7/00* (2006.01)
*H02J 1/00* (2006.01)
*H02J 3/00* (2006.01)
*H02J 7/34* (2006.01)
*H02J 3/38* (2006.01)
(Continued)

(52) U.S. Cl.
CPC ............. *H02J 13/0003* (2013.01); *H02J 1/102* (2013.01); *H02J 1/14* (2013.01); *H02J 1/16* (2013.01); *H02J 3/381* (2013.01); *H02J 3/387* (2013.01); *H02J 7/34* (2013.01); *H02J 7/35* (2013.01); *H02J 9/062* (2013.01); *H02J 13/0062* (2013.01); *H02J 13/0075* (2013.01); *H02J 13/0079* (2013.01); *H02J 2001/004* (2013.01); *Y02B 10/72* (2013.01); *Y02B 90/222* (2013.01); *Y02T 90/168* (2013.01); *Y02E 10/766* (2013.01); *Y04S 10/126* (2013.01); *Y04S 20/12* (2013.01); *Y04S 30/12* (2013.01); *Y02E 60/721* (2013.01); *H02J 3/383* (2013.01); *H02J 3/386* (2013.01); *Y02E 10/563* (2013.01); *Y02E 10/566* (2013.01); *Y02E 10/763* (2013.01); *H02J 3/382* (2013.01)
USPC .............. 320/138; 320/101; 307/11; 307/18; 307/19; 307/43; 307/80

(58) Field of Classification Search
USPC ............ 320/138, 101; 307/11, 18–43, 64–66, 307/72, 74–78, 89, 85–87
See application file for complete search history.

(56) References Cited

U.S. PATENT DOCUMENTS 7,060,379 B2 * 6/2006 Speranza et al. .................. 429/9
7,087,327 B2 * 8/2006 Pearson ........................ 429/431
(Continued)

FOREIGN PATENT DOCUMENTS

WO       WO 0165572 A2 * 9/2001

*Primary Examiner* — Stacy Whitmore
(74) *Attorney, Agent, or Firm* — The Marbury Law Group PLLC

(57) ABSTRACT

Systems and methods are provided for creating and operating a Direct Current (DC) micro-grid. A DC micro-grid may include power generators, energy storage devices, and loads coupled to a common DC bus. Power electronics devices may couple the power generators, energy storage devices, and loads to the common DC bus and provide power transfer.

56 Claims, 26 Drawing Sheets

(51) Int. Cl.
*H02J 1/10* (2006.01)
*H02J 13/00* (2006.01)
*H02J 1/14* (2006.01)
*H02J 1/16* (2006.01)
*H02J 7/35* (2006.01)
*H02J 9/06* (2006.01)

(56) References Cited

U.S. PATENT DOCUMENTS

| | | | |
|---|---|---|---|
| 7,103,240 B2* | 9/2006 | Kline | 385/15 |
| 7,560,831 B2* | 7/2009 | Whitted et al. | 307/64 |
| 8,159,178 B2* | 4/2012 | Serban | 320/101 |
| 8,263,276 B1* | 9/2012 | Gurunathan et al. | 429/429 |
| 8,587,141 B2* | 11/2013 | Bjerknes et al. | 290/44 |
| 8,638,008 B2* | 1/2014 | Baldwin et al. | 307/64 |
| 8,697,267 B2* | 4/2014 | Colello et al. | 429/61 |
| 8,710,699 B2* | 4/2014 | Binder et al. | 307/64 |
| 8,803,358 B2* | 8/2014 | Hafner et al. | 307/29 |
| 2003/0072977 A1* | 4/2003 | Speranza et al. | 429/9 |
| 2004/0053082 A1* | 3/2004 | McCluskey et al. | 429/9 |
| 2004/0053093 A1* | 3/2004 | Colborn et al. | 429/23 |
| 2006/0078773 A1* | 4/2006 | Speranza et al. | 429/23 |
| 2007/0103108 A1* | 5/2007 | Capp et al. | 320/101 |
| 2007/0273210 A1* | 11/2007 | Wang et al. | 307/45 |
| 2008/0030078 A1* | 2/2008 | Whitted et al. | 307/66 |
| 2008/0174278 A1* | 7/2008 | Masias et al. | 320/138 |
| 2008/0217998 A1* | 9/2008 | Parmley | 307/65 |
| 2008/0238205 A1* | 10/2008 | Lee | 307/66 |
| 2009/0021078 A1* | 1/2009 | Corhodzic et al. | 307/67 |
| 2009/0103341 A1* | 4/2009 | Lee et al. | 363/124 |
| 2009/0127932 A1* | 5/2009 | Warren et al. | 307/64 |
| 2009/0189456 A1* | 7/2009 | Skutt | 307/87 |
| 2009/0206670 A1* | 8/2009 | Whitted et al. | 307/64 |
| 2009/0230689 A1* | 9/2009 | Burra et al. | 290/55 |
| 2009/0309551 A1* | 12/2009 | Lazarovich et al. | 320/138 |
| 2010/0076615 A1* | 3/2010 | Daniel et al. | 700/293 |
| 2010/0188045 A1* | 7/2010 | Colello et al. | 320/118 |
| 2010/0213890 A1* | 8/2010 | Winger et al. | 320/106 |
| 2010/0244562 A1* | 9/2010 | Seymour | 307/31 |
| 2011/0055036 A1* | 3/2011 | Helfan | 705/26.1 |
| 2011/0074350 A1* | 3/2011 | Kocher | 320/109 |
| 2011/0121648 A1* | 5/2011 | Pan | 307/26 |
| 2011/0148213 A1* | 6/2011 | Baldwin et al. | 307/82 |
| 2011/0216562 A1* | 9/2011 | Gengenbach | 363/71 |
| 2011/0248569 A1* | 10/2011 | Son et al. | 307/87 |
| 2012/0032517 A1* | 2/2012 | Ido et al. | 307/77 |
| 2012/0056481 A1* | 3/2012 | Corhodzic et al. | 307/66 |
| 2012/0056483 A1* | 3/2012 | Capp et al. | 307/82 |
| 2012/0068533 A1* | 3/2012 | Pan | 307/26 |
| 2012/0080955 A1* | 4/2012 | Fishman et al. | 307/82 |
| 2012/0146587 A1* | 6/2012 | Srinivasan et al. | 320/138 |
| 2012/0161526 A1* | 6/2012 | Huang et al. | 307/77 |
| 2012/0169137 A1* | 7/2012 | Lisi et al. | 307/104 |
| 2012/0200155 A1* | 8/2012 | McDonnell | 307/18 |
| 2012/0299386 A1* | 11/2012 | Kaufman et al. | 307/82 |
| 2012/0326504 A1* | 12/2012 | Ballantine et al. | 307/24 |
| 2012/0326653 A1* | 12/2012 | Godrich et al. | 320/101 |
| 2012/0326668 A1* | 12/2012 | Ballatine et al. | 320/109 |
| 2013/0300376 A1* | 11/2013 | Lanni | 320/138 |
| 2014/0028098 A1* | 1/2014 | Trigiani | 307/39 |

* cited by examiner

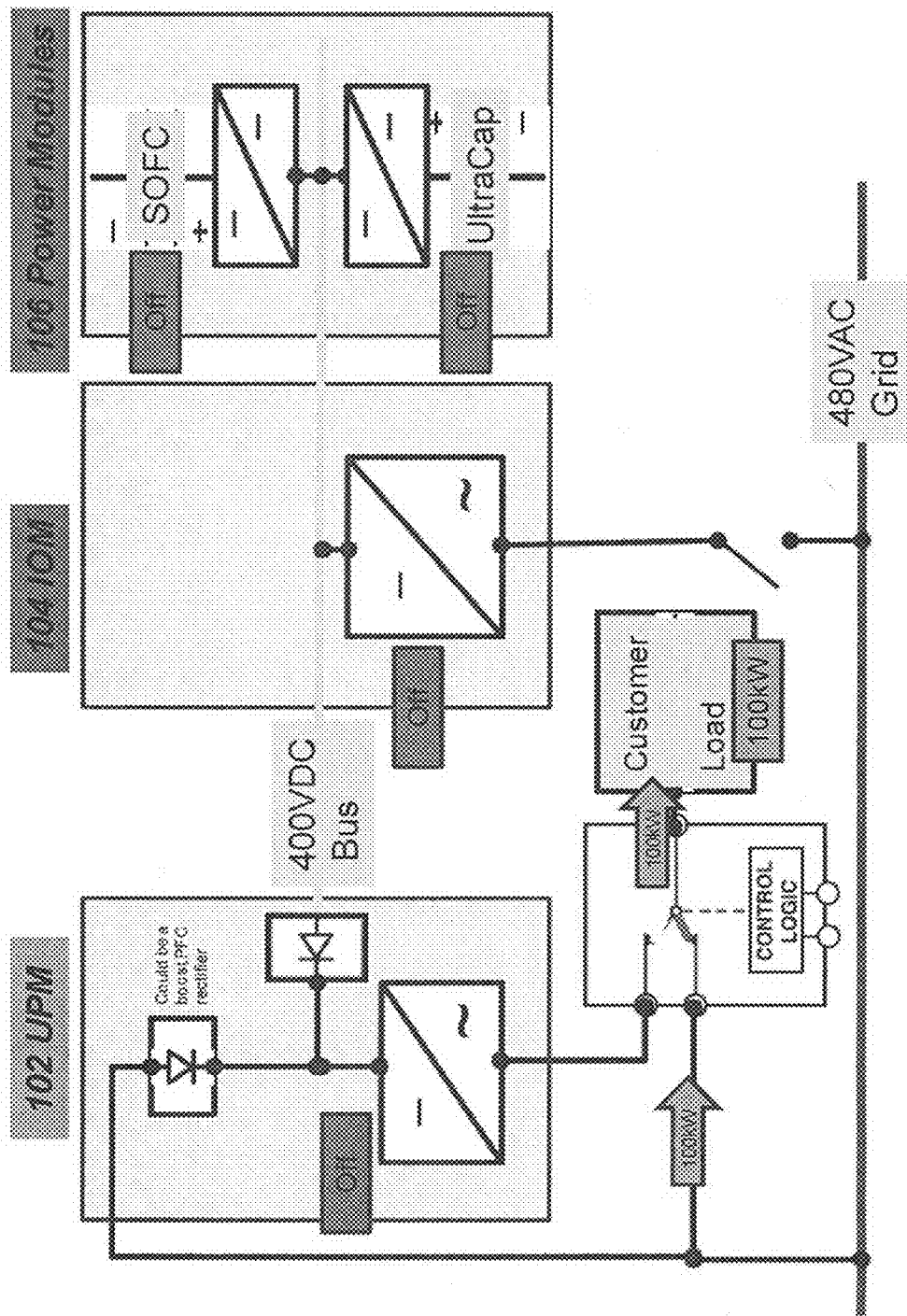
FIG. 1B - Installation / Load From Grid

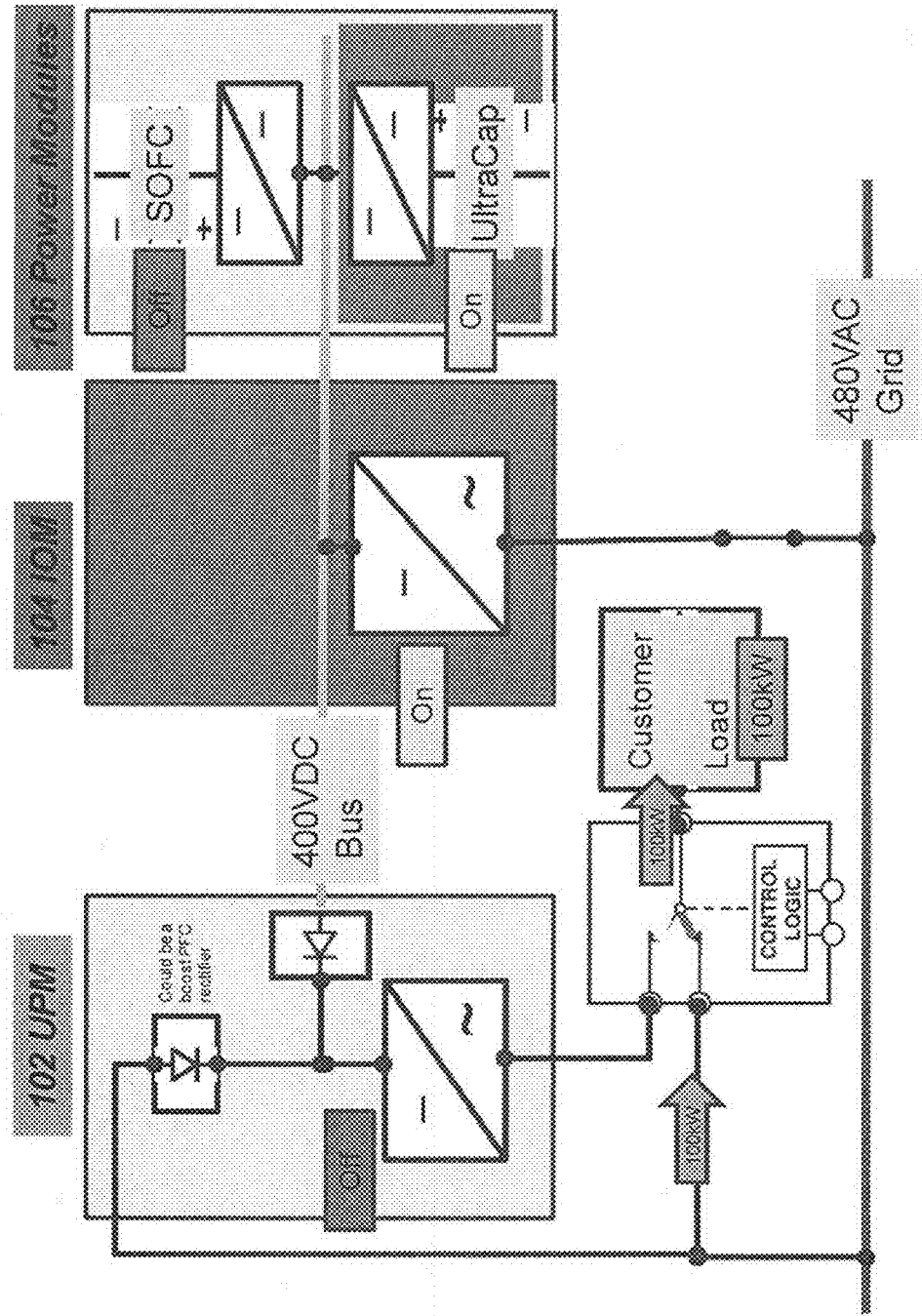
FIG. 1C - IOM Start-up / Charge Ultracap

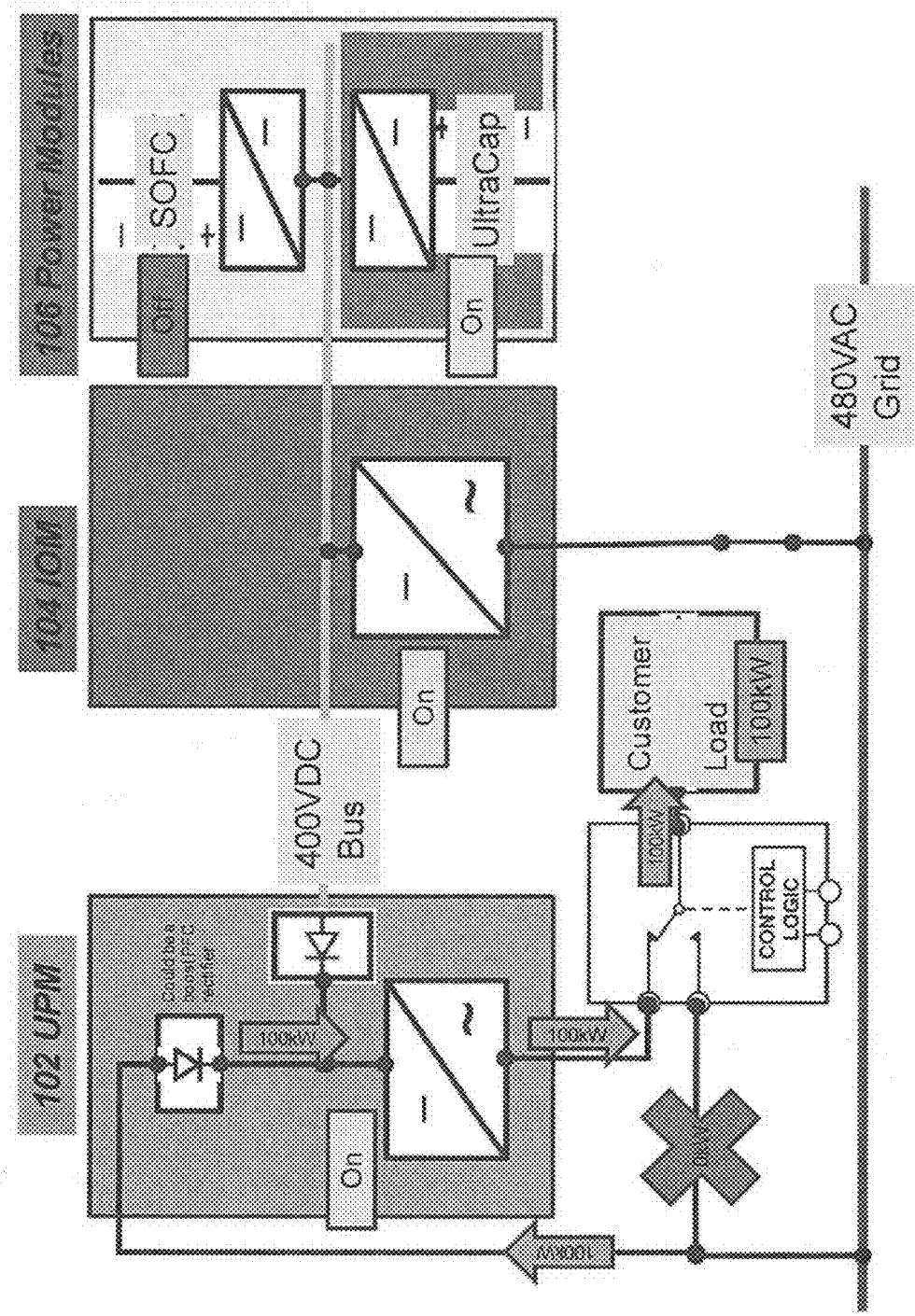

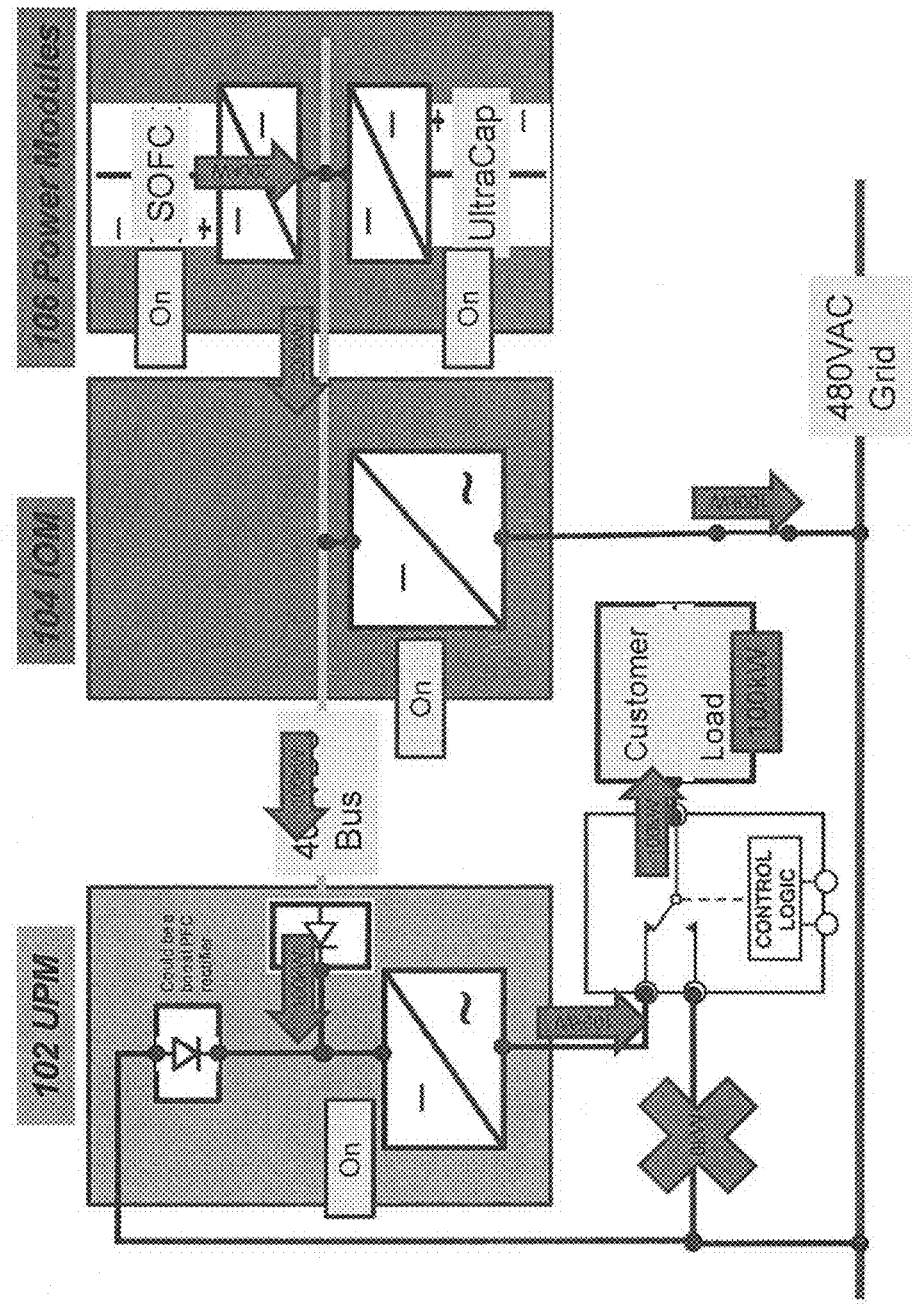

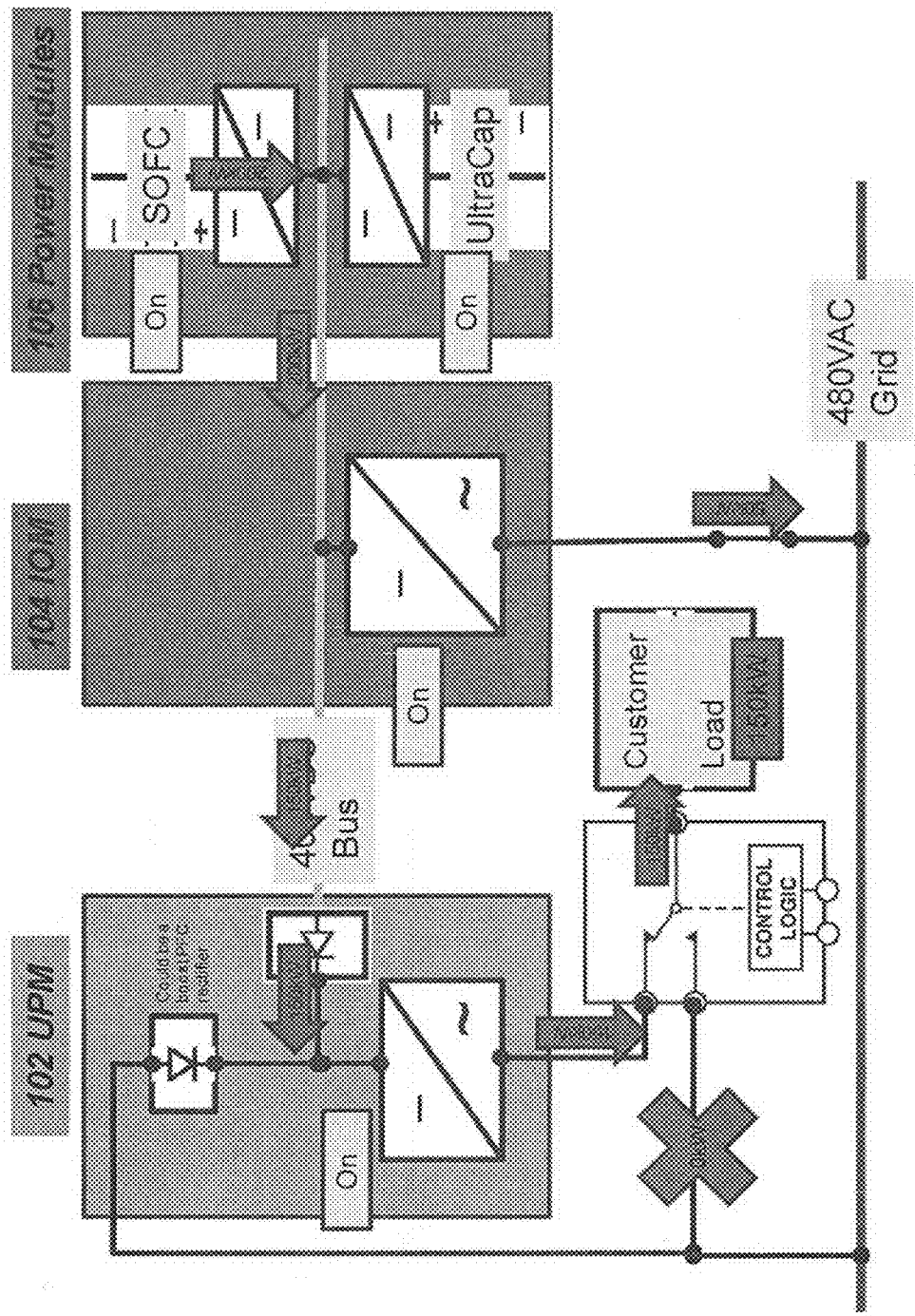
FIG. 1F - Customer Load Increase

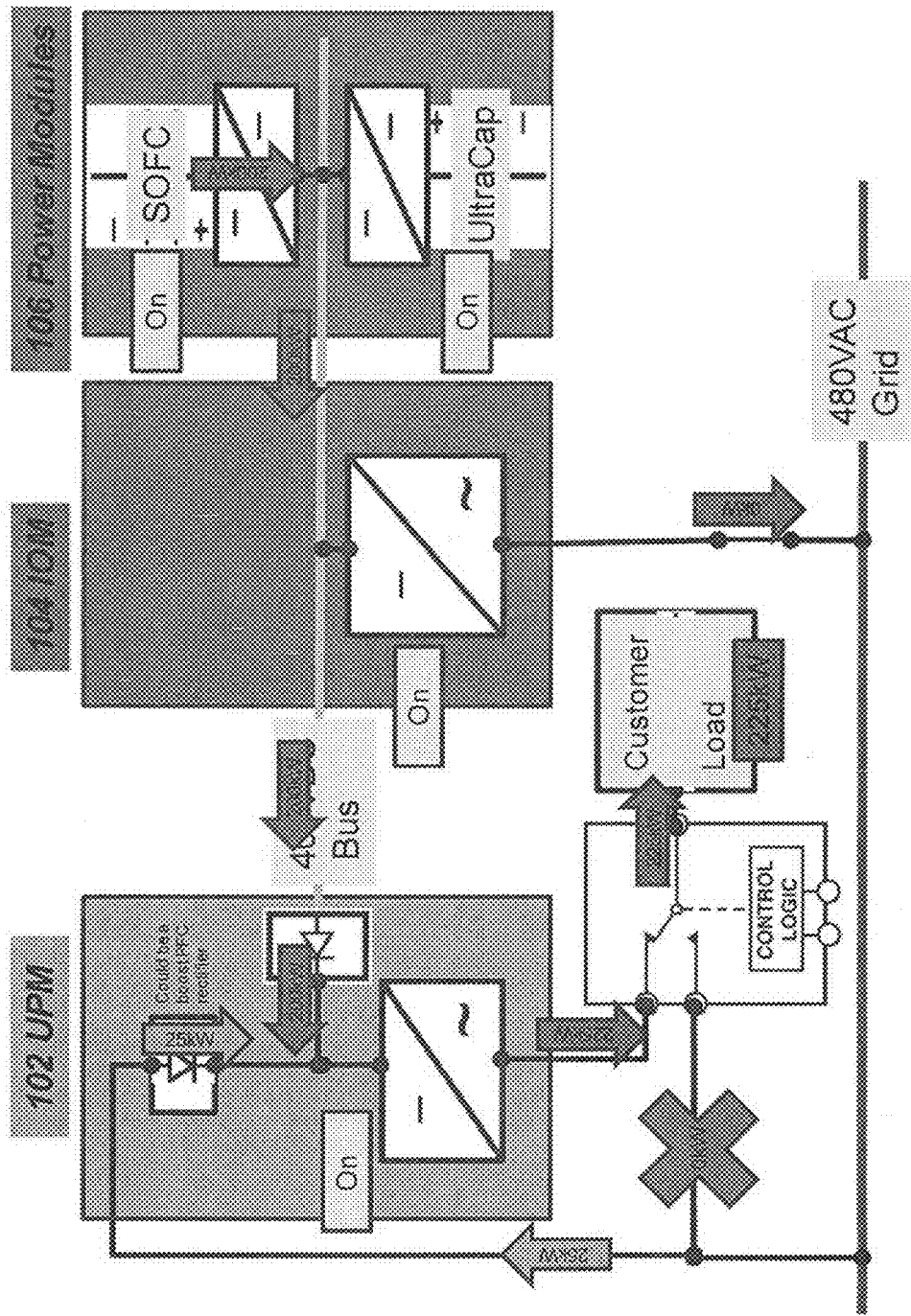
FIG. 1G - Customer Load Spike

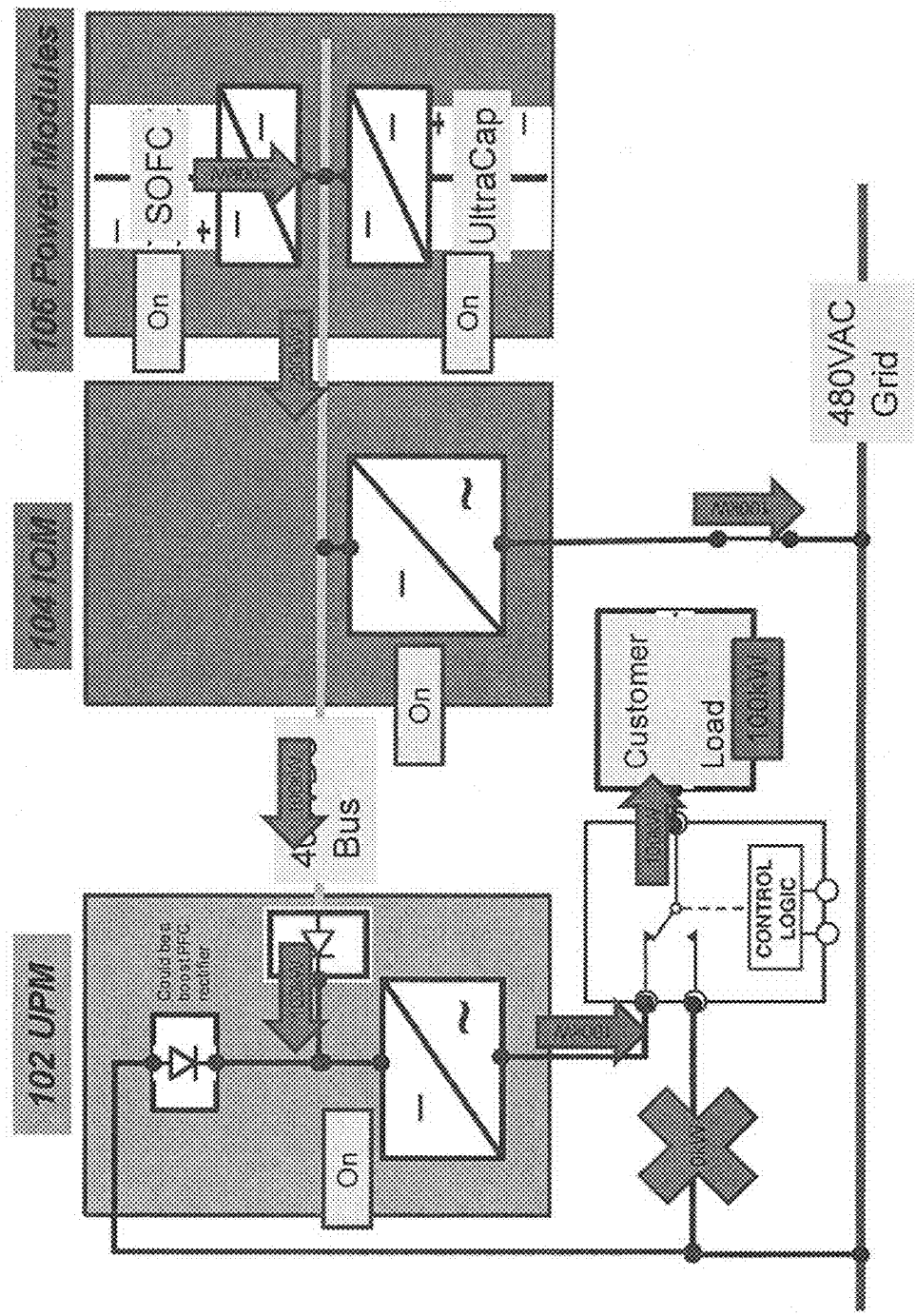
FIG. 1H - Back to Normal Operation.

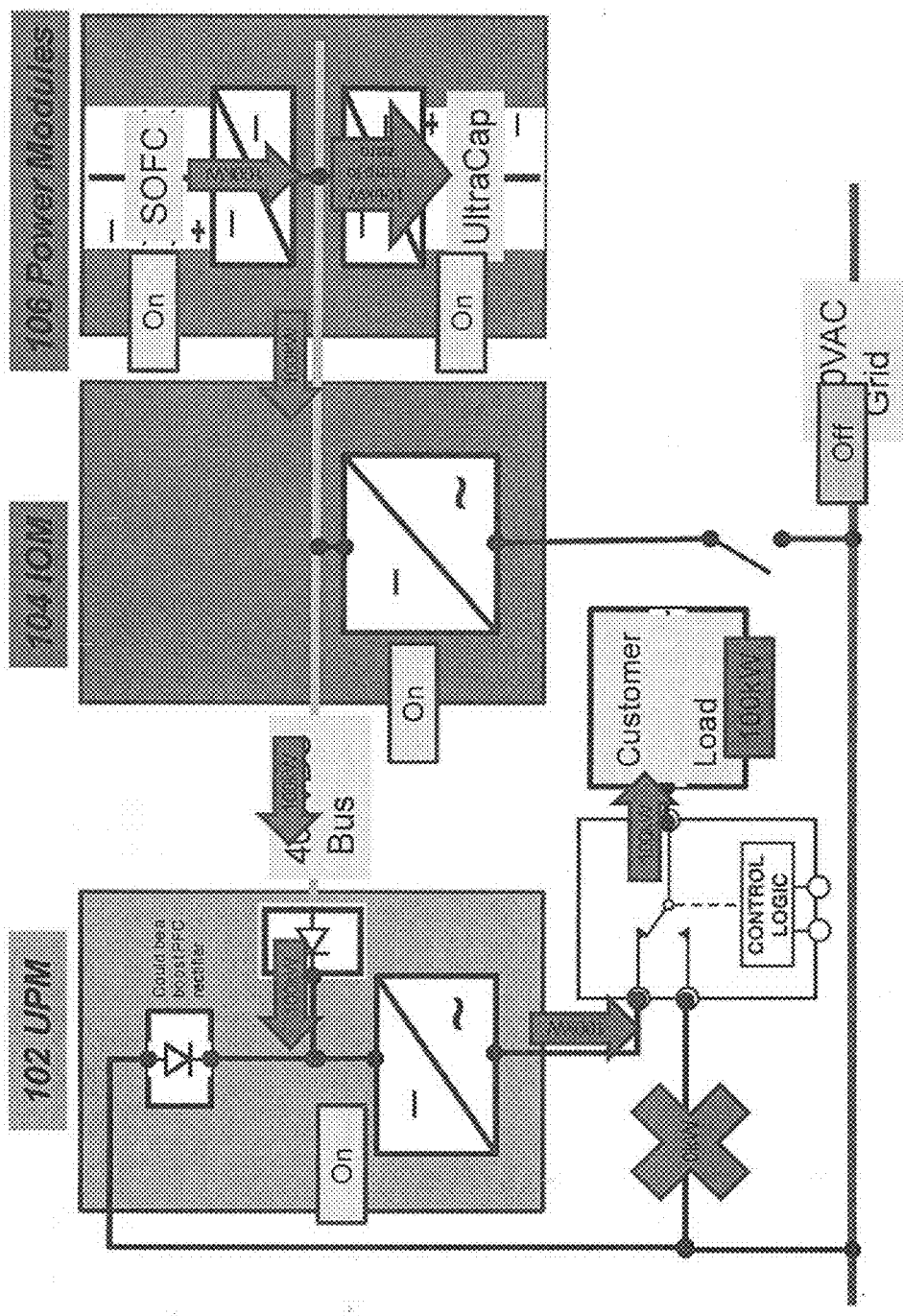
FIG. 1I - Loss of Grid / Ultracap Softens "Step"

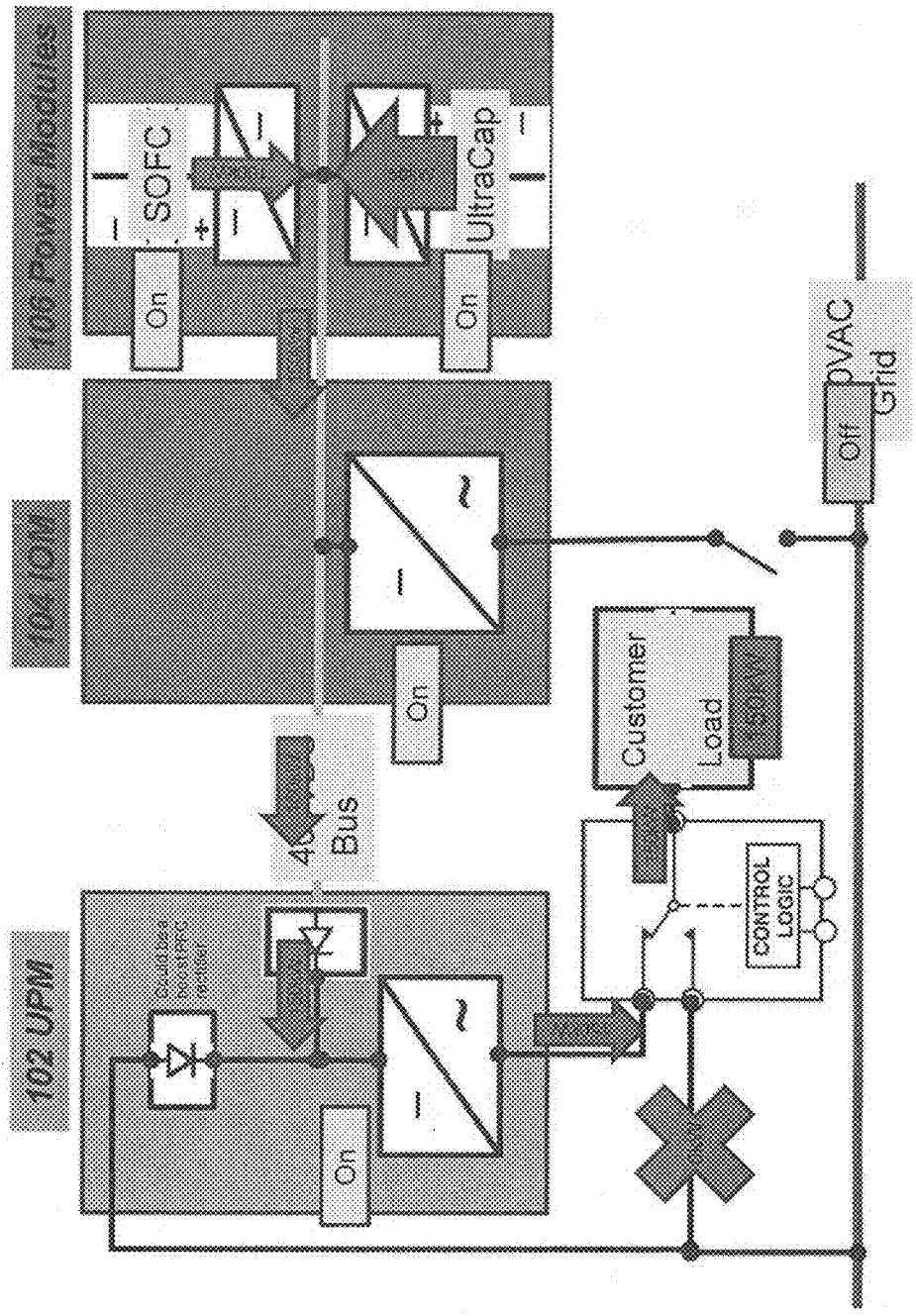
FIG. 1J – Load Transient w/o Grid (part 1)

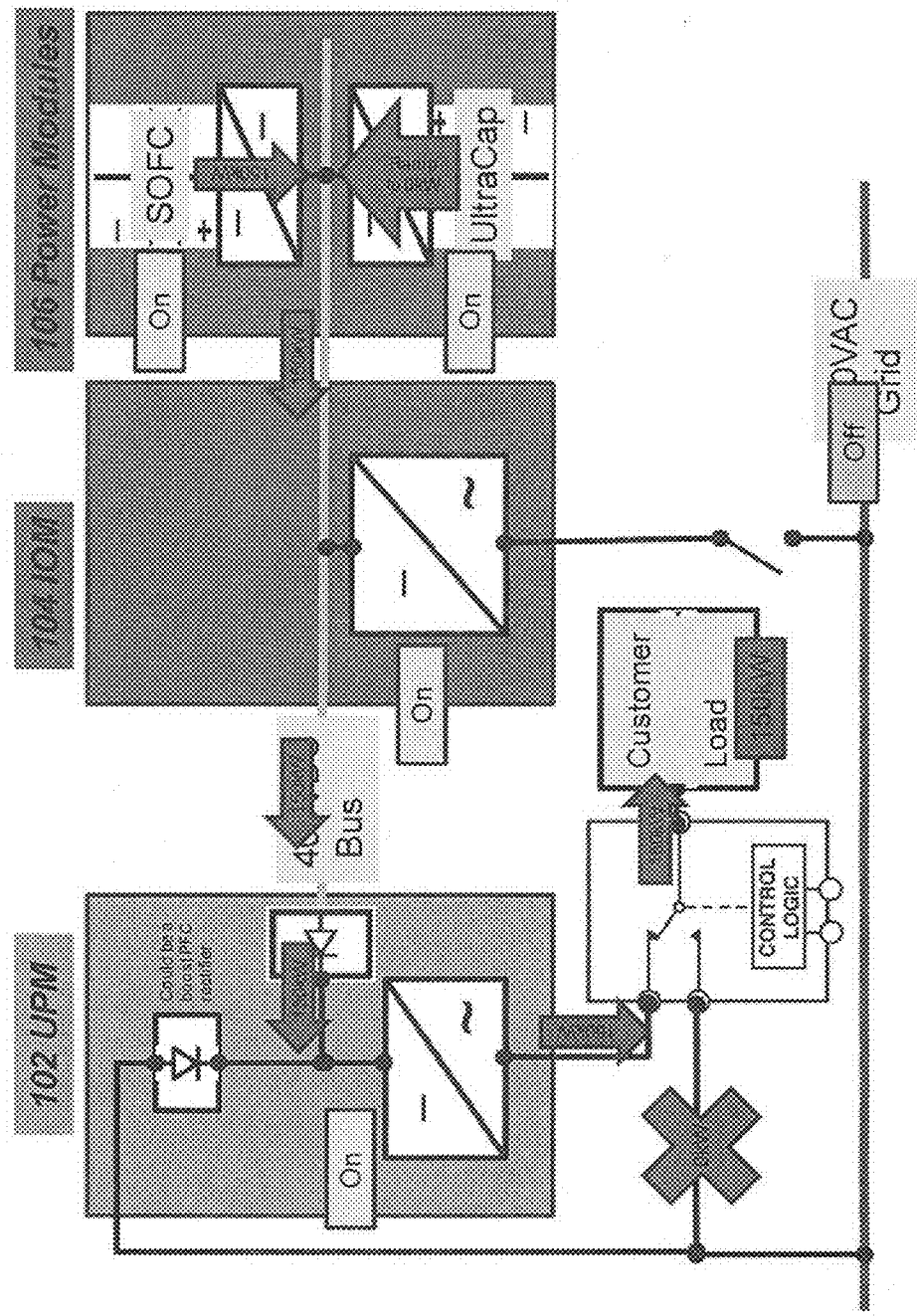
FIG. 1K - Load Transient w/o Grid (part 2)

DC MICRO-GRID

CROSS REFERENCE TO RELATED PATENT APPLICATIONS

This application is a Continuation-in-Part of U.S. patent application Ser. No. 13/295,527, filed Nov. 14, 2011 and entitled "Fuel Cell System with Grid Independent Operation and DC Micogrid Capability" which claims the benefit of priority to U.S. Provisional Patent Application Ser. No. 61/413,629, filed Nov. 15, 2010 and entitled "Fuel Cell System with Grid Independent Operation and DC Micogrid Capability". The present application also claims the benefit of priority to U.S. Provisional Patent Application Ser. No. 61/501,604, filed Jun. 27, 2011, entitled "DC MICROGRID." The contents of all three applications are incorporated herein by reference in their entirety.

BACKGROUND

Electrical power systems can be used to provide electrical power to one or more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their direct current (DC) output into an alternating current (AC). As a result, synchronization of alternative power sources is required.

In addition, many alternative power sources use machines such as pumps and blowers which run off auxiliary power. Motors for these pumps and blowers are typically 3-phase AC motors which may require speed control. If the alternative power source generates a DC, the DC undergoes several states of power conversion prior to delivery to the motor(s). Alternatively, the power to the motors for pumps, blowers, etc. may be provided using the electrical grid, an inverter, and a variable frequency drive. In such a configuration, two stages of power conversion of the inverter are incurred along with two additional stages of power conversion for driving components of the AC driven variable frequency drive. In general, each power conversion stage that is performed adds cost to the system, adds complexity to the system, and lowers the efficiency of the system.

Operating individual distributed generators, such as fuel cell generators, both with and without a grid reference and in parallel with each other without a grid reference is problematic in that switch-over from current source to voltage source must be accommodated. Additionally, parallel control of many grid independent generators, utility anomalies, and/or non-critical load reflections can be problematic.

To address the mode-switch-over issue, a double-inverter arrangement may be utilized. This allows one inverter to be used in grid tie and a second inverter to be used with the stand-alone load. An exemplary double-inverter arrangement with a load dedicated inverter that is located internally in an input/output module of a solid oxide fuel cell (SOFC) system is described in U.S. patent application Ser. No. 12/148,488, filed May 2, 2008 and entitled "Uninterruptible Fuel Cell System", which is incorporated herein by reference in its entirety.

Another approach is to drop power for 5-10 cycles to switch modes. If a single inverter is used, a time of 5-10 cycles would be required to drop grid tie and establish voltage mode control.

Yet another approach is to use frequency droop to control the amount of power sharing in grid tied export or in load stand alone output control.

DESCRIPTION OF THE DRAWINGS

FIGS. 1B to 1K illustrate the system of FIG. 1A in various modes of operation.

DETAILED DESCRIPTION

Figure 1A:
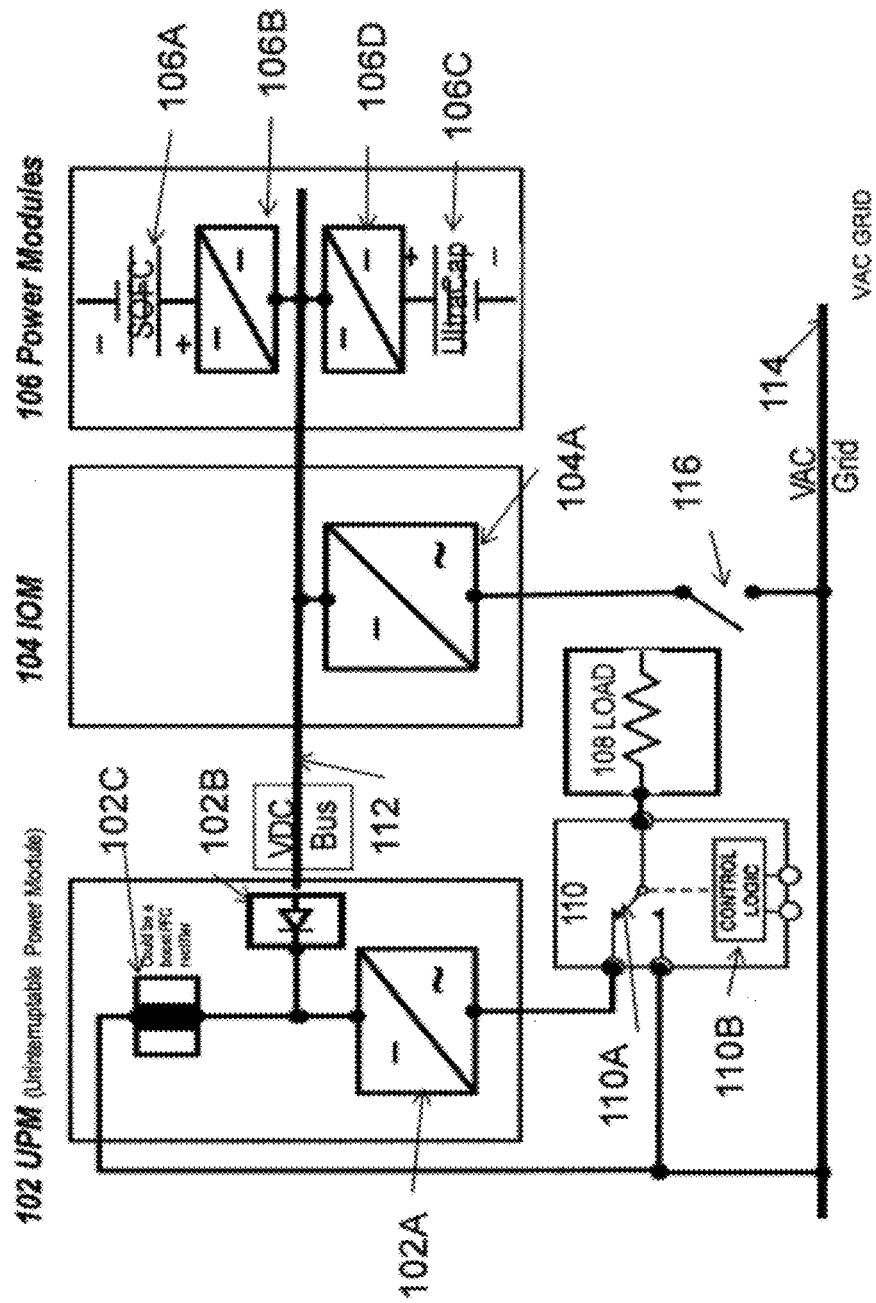
FIG. 1A is a block diagram illustrating a system according to an embodiment.

Referring to FIG. 1, a fuel cell system according to an embodiment includes a uninterruptable power module (UPM) 102, an input/output module (IOM) 104 and one or more power modules (i.e., power generators) 106. If there is more than one power module 106, for example six to ten modules 106, then each power module may comprise its own housing. Each housing may comprise a cabinet or another type of full or partial enclosure, for example the cabinet described in U.S. patent application Ser. No. 12/458,355, filed Jul. 8, 2009, and entitled "Fuel Cell System with Quick Connect Components", which is incorporated herein by reference in its entirety. The modules may be arranged in one or more rows or in other configurations.

The UPM 102 includes at least one DC/AC inverter 102A. If desired, an array of inverters may be used. Any suitable inverter known in the art may be used. The UPM 102 optionally contains an input rectifier, such as an input diode 102B which connects to the output of a DC bus 112 from the power module(s) 106 and to the input of the at least one inverter 102A. The UPM also optionally contains a boost PFC rectifier 102C which connects to the output the electric grid 114, such as a utility grid, and to the input of the at least one inverter 102A.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules (i.e., power generators) may also comprise other generators of direct current, such as solar cell, wind turbine, geothermal or hydroelectric power generators.

The segment(s) 106A of fuel cells may be connected to the DC bus, 112 such as a split DC bus, by one or more DC/DC converters 106B located in module 106. The DC/DC converters 106B may be located in the IOM 104 instead of the power module 106.

The power module(s) 106 may also optionally include an energy storage device 106C, such as a bank of ultracapacitors, batteries, or flywheels. Device 106C may also be connected to the DC bus 112 using one or more DC/DC converters 106D.

The UPM 102 is connected to an input/output module (TOM) 104 via the DC bus 112. The DC bus receives power from power modules 106.

The fuel cell system and the grid 114 are electrically connected to a load 108 using a control logic unit 110. The load may comprise any suitable load which uses AC power, such as one or more buildings, appliances, lights, tools, air conditioners, heating units, factory equipment and machinery, power storage units, information technology (IT) loads, security systems, etc. The control logic unit includes a switch 110A and control logic 110B, such as a computer, a logic circuit or a dedicated controller device. The switch may be an electrical switch (e.g., a switching circuit) or an electromechanical switch, such as a relay.

IT loads, (i.e., devices operating in an IT system) may include one or more of computer(s), server(s), router(s), rack(s), power supply connections, and other components found in a data center environment. As described herein, an IT load (i.e., devices operating in an IT system which may include one or more of computer(s), server(s), router(s), rack(s), power supply connections, and other components found in a data center environment) and IT system are distinguished from devices, such as computers, servers, routers, racks, controllers, power supply connections, and other components used to monitor, manage, and/or control the operation of DC power generators and DC power generation systems in that IT loads do not monitor, manage, and/or control the operation of any DC power generators or DC power generation systems that provide power to the IT loads themselves.

Control logic 110B routes power to the load 108 either from the UPM 102 or from the grid 114 using switch 110A. The at least one fuel cell segment 106A and storage device 106C from module 106 are electrically connected in parallel to the at least one first inverter 104A in IOM and to the at least one second inverter 102A in the UPM 102. The at least one first inverter 104A is electrically connected to the load 108 through the electrical grid 114 using switch 110A in the first position. In contrast to the circuit shown in U.S. patent application Ser. No. 12/148,488, filed May 2, 2008 and entitled "Uninterruptible Fuel Cell System", which is incorporated herein by reference in its entirety, the grid 114 in FIG. 1A is directly connected to the load 108 through the control logic unit 110 without passing through a bidirectional inverter. The at least one second inverter 102A is electrically connected to the load 108 with the switch 110A in the second position without using the electrical grid 114 (i.e., the output of the fuel cell segment 106A does not have to pass through the grid 114 to reach the load 108).

Thus, the control logic 110B selects whether to provide power to the load from the electrical grid 114 (or from the fuel cell segment 106A through the grid) or through the at least one second inverter 102A. The control logic 110B may determine a state of the power modules and select a source to power the load 108 based on the state of the power modules, as described below.

A second switch 116 controls the electrical connection between the IOM 104 and the grid 114. Switch 116 may controlled by the control logic 110B or by another system controller.

By way of illustration and not by way of limitation, the system contains the following electrical paths:

A path to the load 108 from the AC grid 114.

A path from the AC grid 114 through the IOM 104 to storage elements 106C of power modules 106 (for example, ultracapacitors, batteries, or flywheels).

A path from the storage elements 106C of the power modules 106, over the DC bus 112 to the IOM 104 and the UPM 102 in parallel. The DC bus delivers DC to the inverter in the UPM 102. The inverter 102A in the UPM 102 or inverter 104A in IOM 104 delivers AC power to the load 108 depending on the position of the switch 110A.

A path from the power modules 106 (which may include power from the fuel cell segment(s) 106A and/or the storage elements 106C of the power modules 106), over the DC bus 112 to the IOM 104 and the UPM 102. The DC bus delivers DC voltage to the inverter in the UPM 102. The inverter 102A in the UPM 102 delivers AC power to the load 108. Power in excess of the power required by the load 108 is delivered to the AC grid through an inverter 104A in the IOM 104. The amount of power that is delivered to the AC grid 114 will vary according the demands of the load 108. If the amount of power required by the load 108 exceeds the power provided by the power modules 106, the additional power demand may be supplied by the AC grid 114 directly to the load 108 through switch 110A in the first position or to the UPM 102 with the switch 110A in the second position. The grid power is rectified in rectifier 102C in UPM 102 and provided to the inverter 102A in the UPM 102 and converted back to AC for powering the load 108.

FIGS. 1B-1K illustrate various modes of operation of the system shown in FIG. 1A. While the embodiments described below illustrate a load 108 which requires 100 kW of power and the fuel cell segment(s) 106A which output 200 kW of power in steady state, these values are provided for illustration only and any other suitable load and power output values may be used.

FIG. 1B illustrates the system operation during the installation of the system and/or during a period when the load 108 receives power from the grid 114. As shown in this figure, the fuel cell segment(s) 106A and the energy storage device 106C are in the OFF state, the IOM 104 inverter 104A and the UPM inverter 102A are both in the OFF state and the second switch 116 is open such that there is no electrical communication between the IOM and the grid. The control logic switch 110A is in the first position to provide power from the grid 114 to the load 108 through the control logic module 110. As shown in the figure, 100 kW of power is provided from the grid to the load through the control logic module.

FIG. 1C illustrates the system operation during IOM start-up and charging of the energy storage device (e.g., bank of ultracapacitors) 106C from the grid 114 while the load 108 receives power from the grid 114. As shown in this figure, the fuel cell segment(s) 106A are in the OFF state while the energy storage device 106C is in the ON state. The IOM 104 bi-directional inverter 104A is in the ON state and the UPM inverter 102A is in the OFF state. The second switch 116 is closed such that there is electrical communication between the IOM and the grid to provide power from the grid 114 to the energy storage device 106C through the IOM 104 inverter 104A and the DC bus 112. The control logic switch 110A is in the first position to provide power from the grid 114 to the load 108 through the control logic module 110. As shown in the figure, 100 kW of power is provided from the grid to the load through the control logic module.

FIG. 1D illustrates the system operation during UPM start-up following IOM start-up. UPM functions by receiving power from the energy storage device 106C. UPM provides the power from the energy storage device 106C to the load 108. As shown in this figure, the fuel cell segment(s) 106A are in the OFF state while and the energy storage device 106C is in the ON state. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the UPM 102 to the load 108 through the control logic module 110. As shown in the figure, 100 kW of power is provided from the grid 114 to the load 108 through the rectifier 102C and inverter 102A of the UPM 102 and then through the control logic module. Some power may also be provided to the load 108 from the energy storage device 106C via the DC bus 112, UPM 102 and control logic module.

FIG. 1E illustrates the steady state operation of the system. In this mode the fuel cell segment(s) 106A is in the ON state to power the load 108. The segment(s) 106A may provide 200 kW of power in a steady state mode (this may be the designed power output or a maximum power output). As shown in this figure, the energy storage device 106C is in the ON state to act as an emergency backup power source. The IOM 104 bi-directional inverter 104A is in the ON state and the UPM inverter 102A is in the ON state. The 200 kW power output is split between the grid 114 and the load 108. The second switch 116 is closed such that there is electrical communication between the IOM and the grid to provide 100 kW of power from the fuel cell segment(s) 106A to the grid. The control logic switch 110A is in the second position to provide the other 100 kW of power from the fuel cell segment(s) 106A in the power module 106 through the DC bus passing through IOM 104 and through the inverter 102A of the UPM 102 and then through the control logic module 110 to the load 108. Preferably, this 100 kW of power does not pass through the IOM inverter 104A and/or the grid 114 to reach the load 108. While a 200 kW power output split 50/50 between the grid and the load is described above, different power outputs may be used as needed, such as 25 kW to 1000 kW, which may be split 10/90 to 90/10 between the grid and the load.

FIG. 1F illustrates operation of the system during a relatively steady load 108 increase from 100 kW to 150 kW (i.e., when the load requires more power than prior steady state operation). In this mode, more of the power output of the fuel cell segment(s) is provided to the load and less of this power output is provided to the grid than in the stead state mode described above. If desired, 100% of the power output may be provided to the load and 0% to the grid. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid to provide 50 kW of power from the fuel cell segment(s) 106A through the IOM inverter 104A to the grid 114. The control logic switch 110A is in the second position to provide 150 kW of power from the fuel cell segment(s) 106A in the power module 106 through the DC bus passing through IOM 104 and through the inverter 102A of the UPM 102 and then through the control logic module 110 to the load 108. Thus, the power output of the fuel cell segment(s) 106A is preferably split between the grid and the load in this mode. Preferably, the power does not pass through the IOM inverter 104A and/or the grid 114 to reach the load 108.

FIG. 1G illustrates operation of the system during a sudden load 108 spike which requires more power than the fuel cell segment(s) 106A can generate at that time. For example, the load spike is from 100 kW to 225 kW while the segment(s) 106A can only generate 200 kW of power in steady state or in maximum power mode. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. However, no power is provided from fuel cell segment(s) 106A through the IOM inverter 104A to the grid 114 due to the load spike. The control logic switch 110A is in the second position to provide power from the fuel cell segment(s) 106A in the power module 106 and from the grid 114 through the DC bus passing through IOM 104 and through the inverter 102A of the UPM 102 and then through the control logic module 110 to the load 108. In this mode, the power to the load is provided from both the fuel cell segment(s) and the grid. As shown, 200 kW from the segment(s) 106A is provided through the DC bus 112, diode 102B, inverter 102A and switch 110A to the load 108, while 25 kW is provided from the grid 114 through the rectifier 102B, inverter 102A and switch 110A to the load 108 to achieve a total 225 kW of power required by the load. Preferably, the power from the fuel cell segment(s) does not pass through the IOM inverter 104A and/or the grid 114 to reach the load 108.

FIG. 1H illustrates operation of the system during a return to normal or steady state operation after the sudden load 108 spike. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, the fuel cell segment(s) continue to output steady state or maximum power (e.g., 200 kW) which is split between the load and the grid. As shown, 200 kW from the segment(s) 106A is provided to the IOM 104. IOM 104 provides 100 kW of power from fuel cell segment(s) 106A through the IOM inverter 104A to the grid 114. The DC bus 112 provides the remaining 100 kW of power from IOM 104 through diode 102B, inverter 102A and switch 110A to the load 108. Preferably, the power does not pass through the IOM inverter 104A and/or the grid 114 to reach the load 108.

FIG. 1I illustrates operation of the system during loss of power from the grid 114 (e.g., during a black out). The fuel cell segment(s) 106A is in the ON state to power the load 108. As shown in this figure, the energy storage device 106C is in the ON state to absorb power from the fuel cell segment(s) 106A and to the soften the "step" that occurs during the loss of the grid power. The IOM 104 bi-directional inverter 104A is in the ON state and the UPM inverter 102A is in the ON state. The second switch 116 is opened such that there is no electrical communication between the IOM and the grid. A sensor can sense the loss of grid power and a controller can open the switch 116 in response to the sensed grid outage. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, out of the 200 kW total power output from the segment(s) 106A, 100 kW is provided to the DC bus 112 and 100 kW is provided to the energy storage device 106C to soften the step. The DC bus 112 provides the 100 kW of power from IOM 104 through diode 102B, inverter 102A and switch 110A to the load 108. The power output of the segment(s) 106A is then gradually reduced to 100 kW to meet the requirements of the load 108.

FIG. 1J illustrates operation of the system during loss of power from the grid 114 (e.g., during a black out) and in case of a load transient (e.g., increased demand for power from load 108) while the fuel cell segment(s) output a reduced amount of power (e.g., 100 kW) which meets the steady state requirements of the load. The fuel cell segment(s) 106A is in the ON state to power the load 108. As shown in this figure, the energy storage device 106C is in the ON state to provide additional power to the load 108. The IOM 104 bi-directional inverter 104A is in the ON state and the UPM inverter 102A is in the ON state. The second switch 116 is opened such that there is no electrical communication between the IOM and the grid. The control logic switch 110A is in the second position to provide power from the fuel cell segment(s) 106A and the energy storage device 106C in the power module 106 through the DC bus passing through IOM 104 and through the inverter 102A of the UPM 102 and then through the control logic module 110 to the load 108. In this mode, 100 kW from the segment(s) 106A and 50 kW from the energy storage device is provided to the DC bus 112. Thus, the DC bus 112 provides the 150 kW of power from IOM 104 through diode 102B, inverter 102A and switch 110A to the load 108. Preferably, the power does not pass through the IOM inverter 104A and/or the grid 114 to reach the load 108.

FIG. 1K illustrates operation of the system during loss of power from the grid 114 (e.g., during a black out) and in case of a continuing load transient (e.g., continued increased demand for power from load 108). The operation is the same as that shown in FIG. 1J, except that the power output of the energy storage device 106C is ramped down to zero over time and the power output of the fuel cell segment(s) is ramped up to the power needed by the load (e.g., 150 kW) over the same time. Thus, over time, the load receives more and more power from the fuel cell segment(s) 106A and less and less power from the energy storage device 106C until all of the required power is supplied to the load 108 by the fuel cell segment(s). Thus, the energy storage device acts as a bridging power source during the initial load transient and is then phased out during the continuing load transient.

Figure 2:
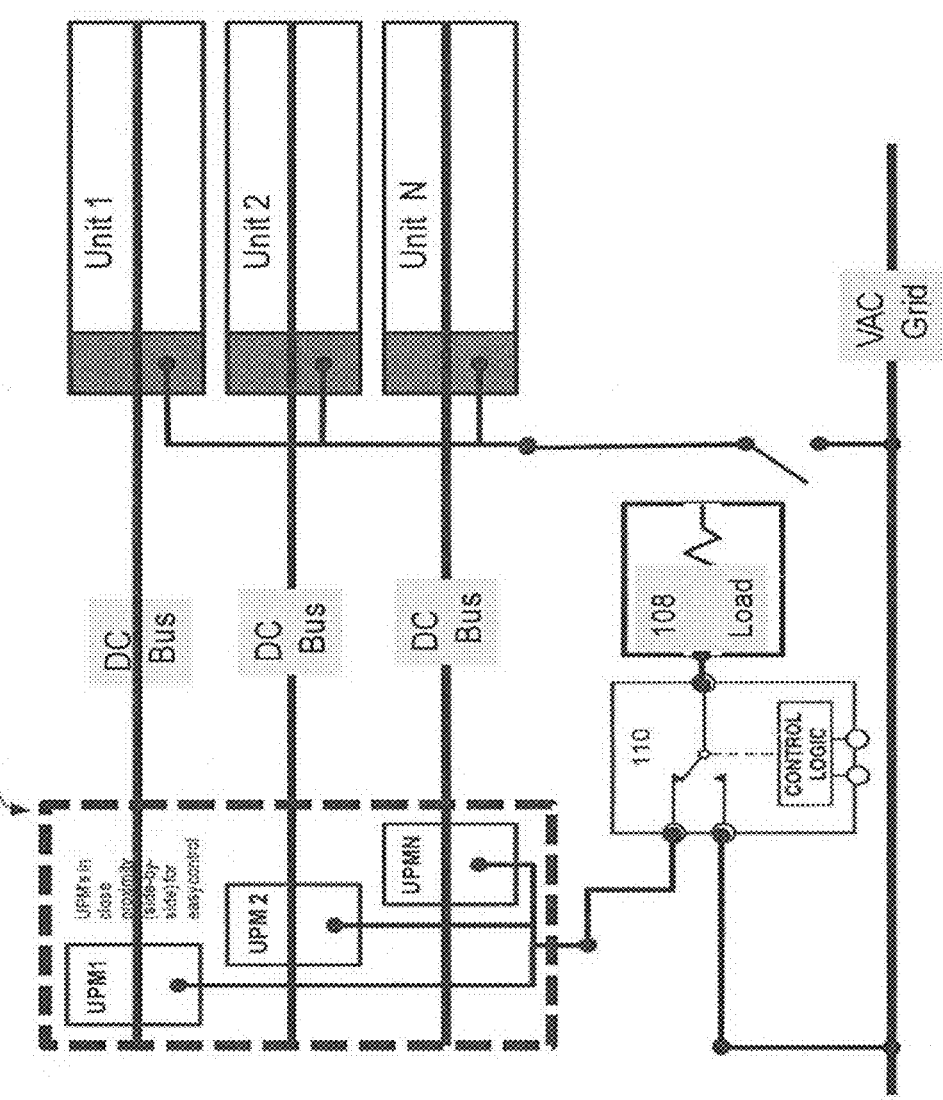
FIGS. 2 and 3 are block diagrams illustrating a DC micro-grid according to an embodiment.
Figure 3:
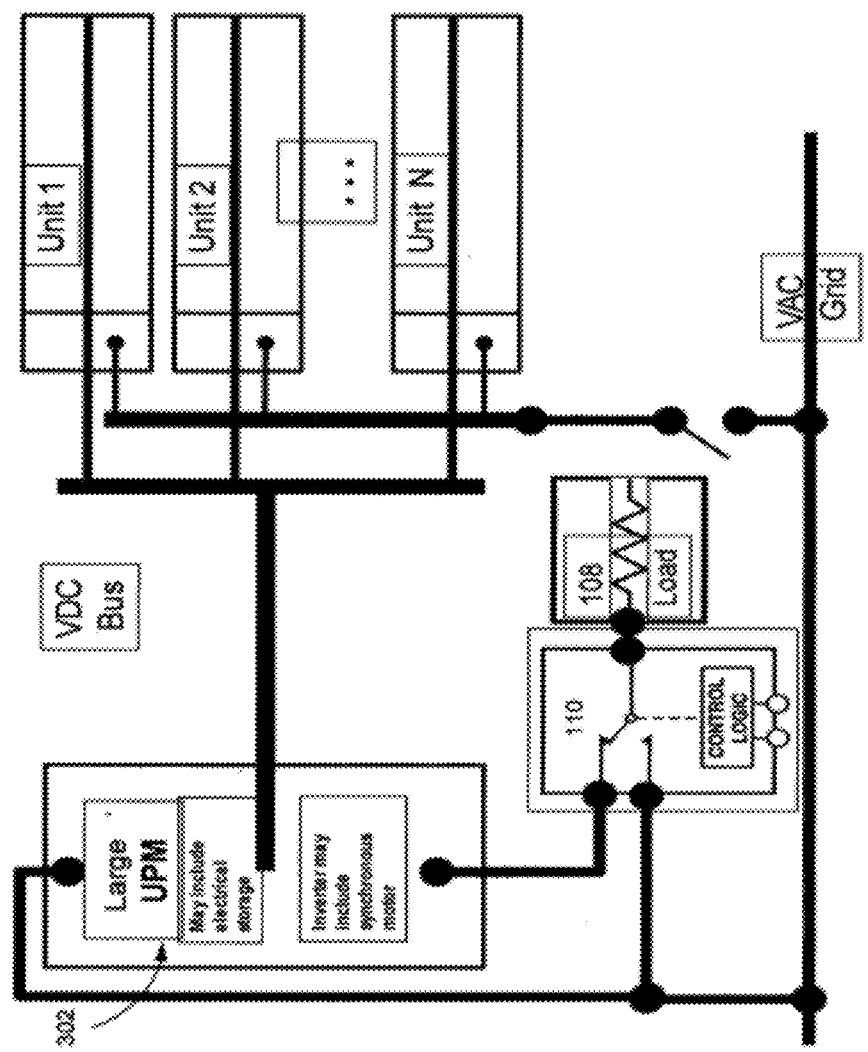

Referring to FIGS. 2 and 3, the output of the DC sources 1 to N are paralleled at the DC-output point, and a DC bus is created. Each DC source 1 to N may comprise one or more power module(s) (i.e., power generator(s)) 106 and an associated IOM 104. The 1 to N sources feed the customer load via a single UPM. Thus, the plurality of power module/IOM pairs share a common UPM. For example, the DC bus may form a DC micro grid connecting any number of DC sources (e.g., SOFC and power conditioning systems, solar panels, wind turbines, etc.) or AC sources converted to DC outputs (e.g., diesel generator paired with a power converter, small generator attached to a ticket turnstile at a concert venue, etc.) together at one UPM. In this manner, any DC source or AC source, regardless of its power characteristics may be used to provide power to the UPM 202. The UPM 202 may be a large assembly of individual UPM's 102 shown in FIG. 1A capable of output of many multiples of the output of the source systems themselves. As illustrated, in FIG. 2, the UPM 202 comprises "N" UPMs 102 (i.e., one UPM for each DC source), with a separate DC bus connecting each DC power source to a dedicated UPM 102. The N UPM's 102 may be arranged in close proximity (e.g., side by side) in one housing or in separate housings to form the UPM assembly 202.

In an alternative embodiment shown in FIG. 3, the assembly 202 of smaller dedicated UPM's 102 may be replaced by one large UPM 302. In this embodiment, the UPM 302 may include an electrical storage device (e.g., bank of batteries or ultracapacitors) and/or a synchronous motor. In general, UPM inverters may include rotating machinery (e.g., a motor, flywheel, etc.) to enhance stored energy content and/or increase reliability and inertia of output.

In summary, the DC sources may comprise fuel cell power modules and an IOM. The inverter within each UPM may be a modular assembly of smaller inverters controlled as one large inverter acting with inputs and/or outputs in parallel. An inverter within the main IOM may be a modular assembly of smaller inverters which are controlled as one large inverter acting with inputs and/or outputs in parallel.

In an embodiment, rectification is provided in the UPM to allow feed from the grid when the stacks are off-line, thus providing the load a protected bus. A boost converter may be used to maintain a good power factor to the grid.

In another embodiment, power from stored energy within an SOFC system or the UPM is used to create a "UPS" unit which has three energy inputs: grid energy; SOFC segment energy; and stored energy (e.g., ultracapacitors, flywheeesl, or batteries).

In yet another embodiment, a DC micro-grid is connected to other distributed generators such as solar power hardware or wind power hardware. In an embodiment in which fuel cells, such as SOFC systems, and other distributed generators such as solar power hardware and/or wind power hardware are connected to the DC micro-grid, when an oversupply of energy compared to the load requirements is produced by the solar power hardware and/or wind power hardware, power generation from the fuel cells may not be required. The oversupply of energy generated by the other distributed generators may be sent to the fuel cells, and the fuel cells may be operated in pump mode (i.e., electrolysis mode). In this manner, spent fuel (e.g., water or $CO_2$) may be run backwards through the fuel cells to produce useable fuel (e.g., $H_2$ or hydrocarbon fuel), which is stored for future use by fuel cells in fuel cell mode, as described in U.S. patent application Ser. No. 10/653,240, filed Sep. 3, 2003 and entitled "Combined Energy Storage and Fuel Generation with Reversible Fuel Cells", which is incorporated herein by reference in its entirety.

In an embodiment, the DC micro-grid is connected to DC loads such as the loads of DC data centers or DC vehicle chargers.

In yet another embodiment, when an IOM and UPM are composed of a cluster of inverters acting in parallel, some or all these inverters may be de-energized depending upon customer load conditions. For example, in a 200 kW generation capacity scenario where the customer load is 150 kW, the IOM inverters may be de-energized such that they only support 50 kW instead of a full 200 kW of grid-tied output. Further, in this scenario, it may be that only a portion of the possible inverters in the IOM assembly may be installed into the IOM, thus providing cost savings in terms of equipment required to support the specific customer load scenario.

Figure 4:
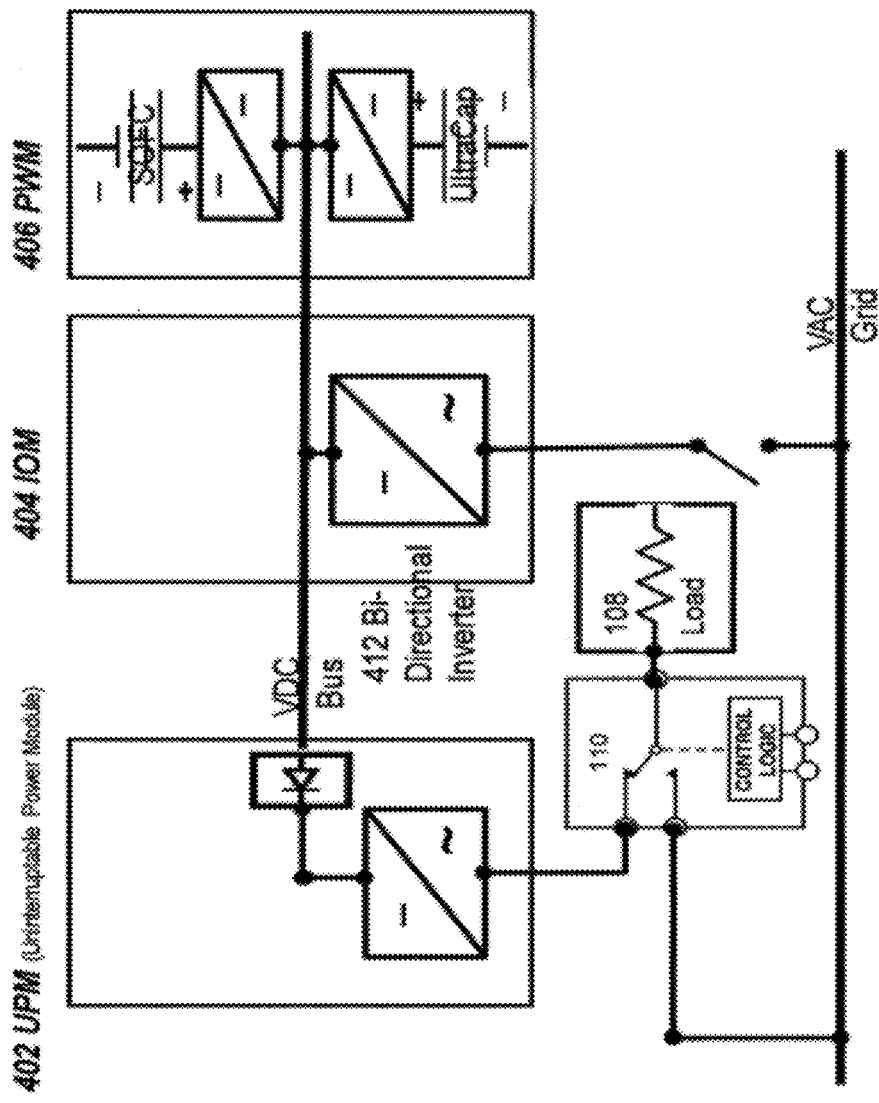
FIG. 4 is a block diagram illustrating an IOM comprising an inverter that is configured for "bi-directional" operation according to an embodiment.

Referring to FIG. 4, in an embodiment, an IOM 404 comprises inverters 412 that are configured for "bi-directional" operation. Such an inverter may have four-quadrant operation. If the grid-tied inverter has "bi-directional" operation, then the rectified feed does not need to be supplied to the UPM 402. Grid power during start-up may come through the grid tied inverter 412 instead of via a rectified input to the UPM 402. This embodiment also provides power from power module(s) 406 for protection of the customer load.

Figure 5:
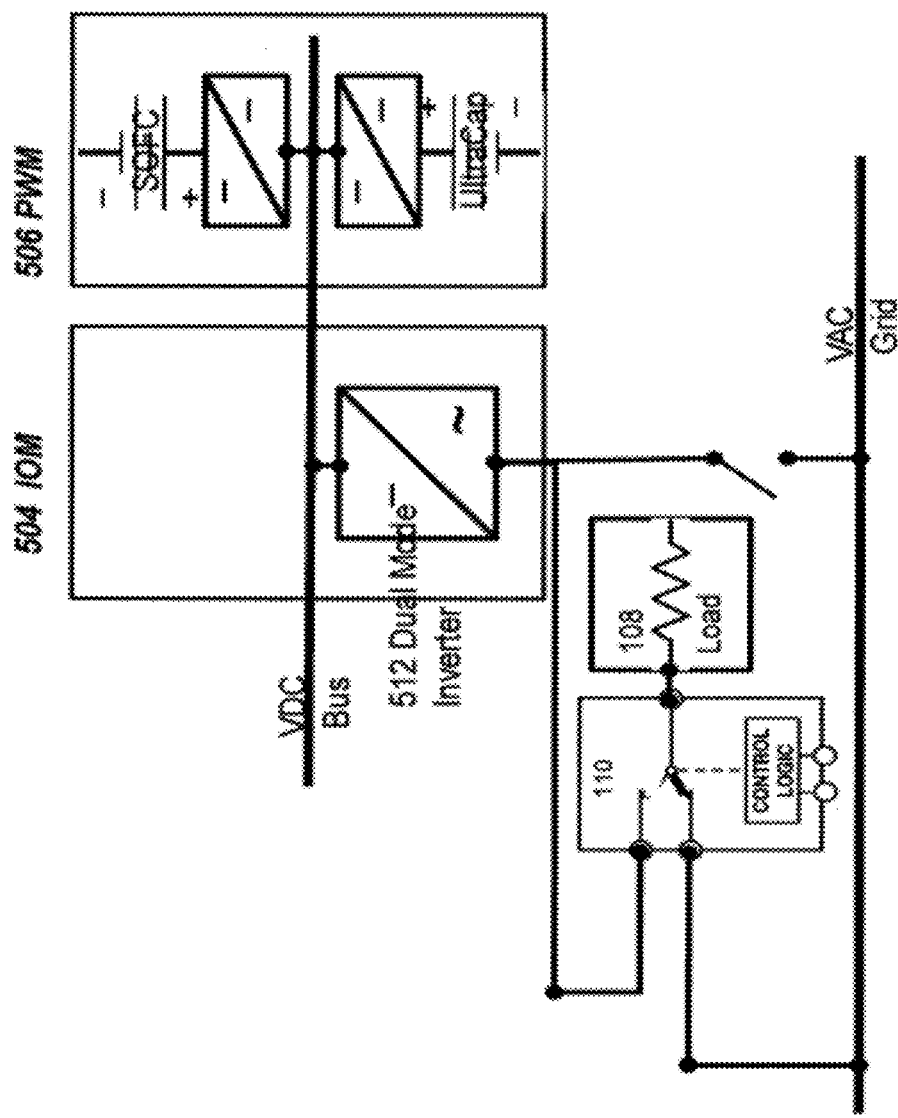
FIG. 5 is a block diagram illustrating an IOM comprising an inverter that is configured for dual mode functionality according to an embodiment.

Referring to FIG. 5, in an embodiment, a UPM is not utilized. In this embodiment, an IOM 504 comprises an inverter 512 that is configured for dual mode functionality. The dual mode inverter 512 is configured to operate with a grid reference and also in a stand-alone mode, supporting a customer load without a grid reference. In this embodiment an output power interruption would be required in order to switch between power generation in one mode and another mode.

FIGS. 6A-6D illustrate various modes of operation of the system shown in FIG. 1A, in which an electric vehicle (EV) charging module (ECM) is used instead of or in addition to the UPM 102. In some modes of operation the ECM may perform the functions of the UPM.

The systems of FIGS. 6A-6D offer several advantages when used in EV charging application. In particular, these systems remove the need for the grid to supply large peaks of power during quick charging of a large number of EVs. The systems can also be used for EV charging in areas where it would be too expensive to provide grid power, and where it would be more cost effective to lay a natural gas pipeline.

Figure 6A:
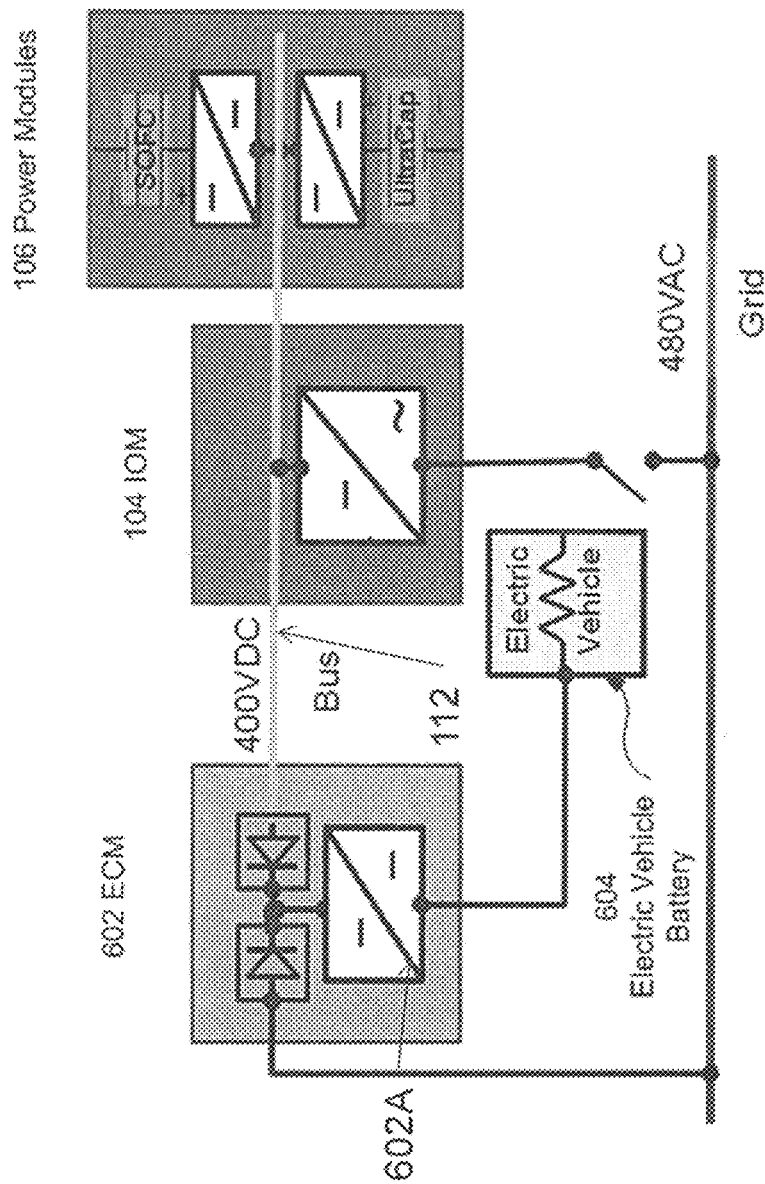
FIGS. 6A-6E illustrate various modes of operation of the system of the type shown in FIG. 1A to provide power to an electric vehicle (EV) charging station according to embodiments.

Referring to FIG. 6A, an EV charging station comprises one or more power modules 106, an IOM 104 and an ECM 602. ECM contains a DC/DC converter 602A instead of the inverter 102A of UPM 102. In this embodiment, the EV charging station (e.g., ECM 602) has access to grid power. The EV charging station may feed power simultaneously to the grid and the EV battery. A quick (e.g., 10-20 minute) charge may be provided from ECM 602 to the EV battery 604 using power from the FCM 106. Whenever an EV battery 604 is connected to the charging station (e.g., ECM 602) for a charge, the FCM 106 power is automatically diverted from feeding the grid into the charging station. The diversion of power from the grid to the EV battery 604 may be accomplished by the control logic as illustrated in FIG. 1A and as discussed previously. The grid power may serve as a backup power for the charging station when the power modules 106 are unavailable.

Figure 6B:
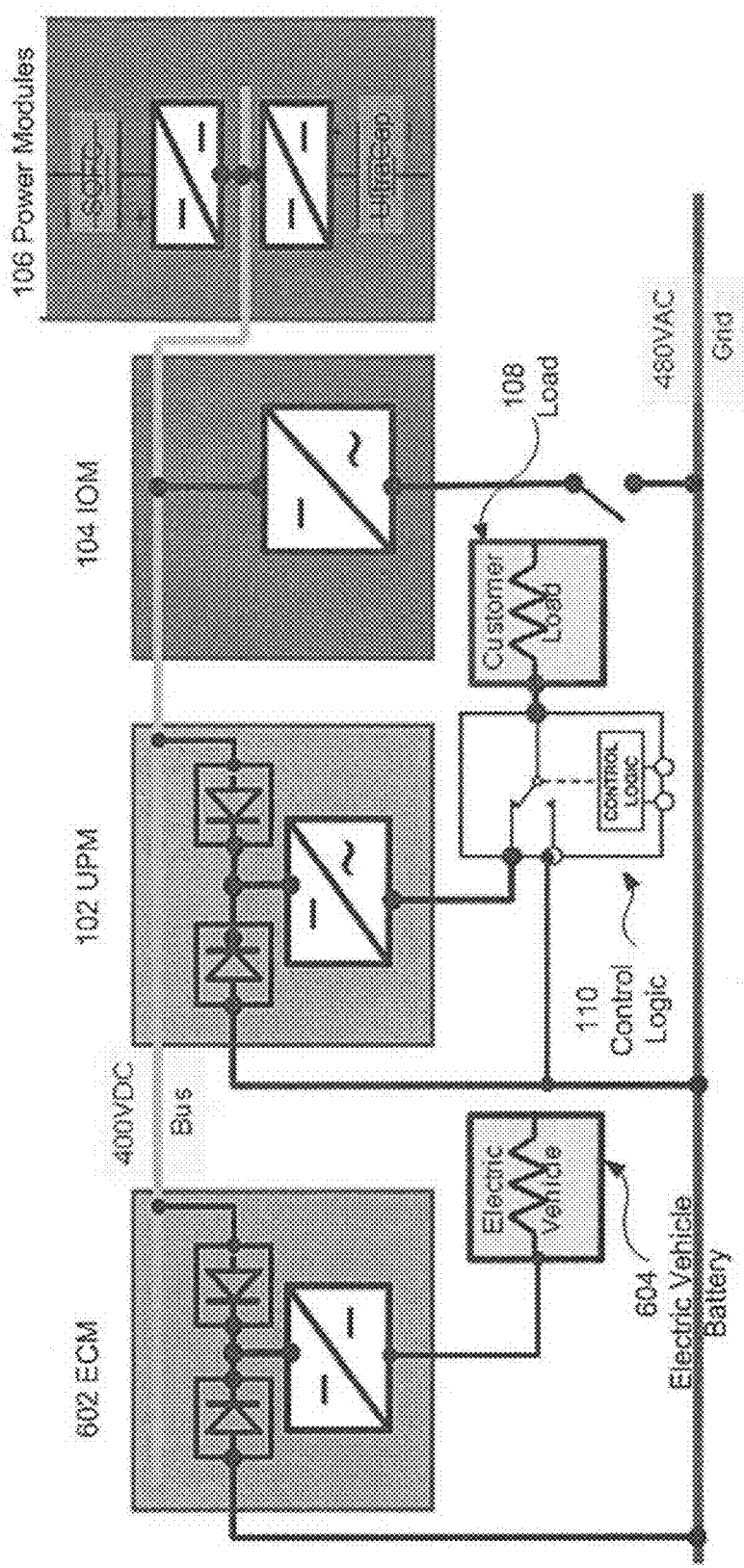

Referring to FIG. 6B, an EV charging station comprises one or more power modules 106, an IOM 104, a UPM 102, control logic unit 110 and an ECM 602. In this embodiment, the EV charging station 602 may also be used to supply a customer load 108 while feeding grid power and charging an EV battery 604. In this configuration, the EV charging station feeds the grid and also provides uninterrupted power to the customer load 108 (such as an office building). The IOM 104 feeds power to the grid, while the UPM 102 supplies power to the customer load 108. The ECM 602 acts as the EV charging station and draws power from the 400V DC bus 112. Thus, the UPM 102 and ECM 602 are connected in parallel to the DC bus 112. While the customer load 108 is supplied without interruption, anytime a vehicle drives in to get charged by the ECM 602, a portion of the power being fed to the grid is diverted to the ECM 602 for the time it takes to charge the EV battery 604. Again, this configuration overcomes the challenge of drawing high peak power from the grid, which is a major issue today especially during day time, when the grid is already supplying full capacity.

A typical application of this configuration would be to supply power to an office building. The load 108 from the building (including data centers, lighting etc) can be supplied clean uninterrupted power from the UPM 102, while power is being fed to the grid. Charging stations can be installed at the car park of this building for the employees and visitors of the company. EV batteries 604 can be charged, and then parked at the car park. Options for both quick charging (1 C) and trickle charging (0.1 C) can be provided at the charging stations, based on the time constraints of the car owner.

Figure 6C:
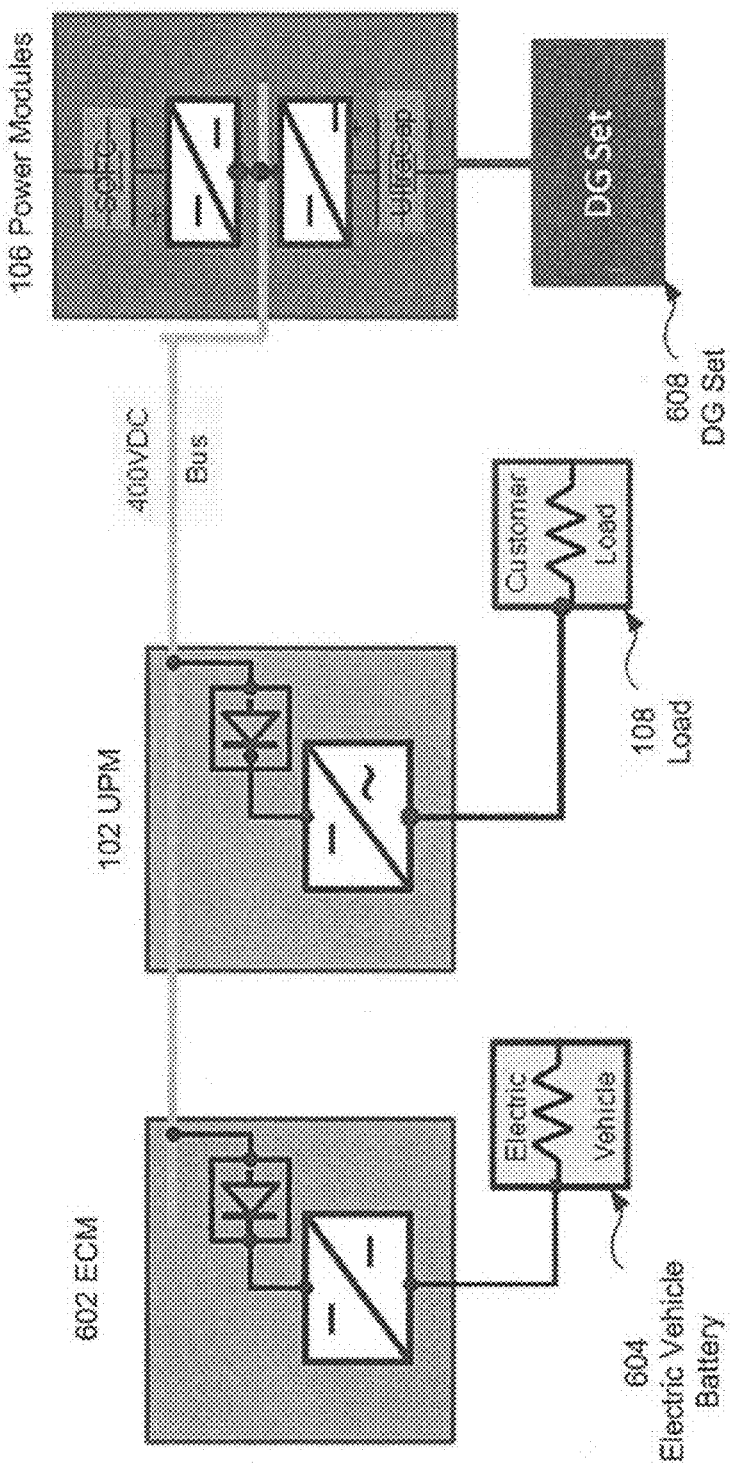

Referring to FIG. 6C an EV charging station comprises one or more power modules 106, a UPM 102, an ECM 602 and a DG set 608. This configuration is suitable for use in remote areas where grid power is not available. In this configuration, the UPM 102 draws power from the DC bus connected to the power modules 106, and feeds the customer load 108. This customer load 108 also acts like a base load to the power modules 106, which allows the system to operate at a certain minimum efficiency (in the configurations illustrated in FIGS. 6A and 6B above, the grid provides the minimum base load for efficient performance). In an embodiment, the power modules 106 and the UPM 102 are rated such that the maximum customer load is always supplied while the ECM 602 is operational. The DG set 608 is used to start up the power modules 106.

Figure 6D:
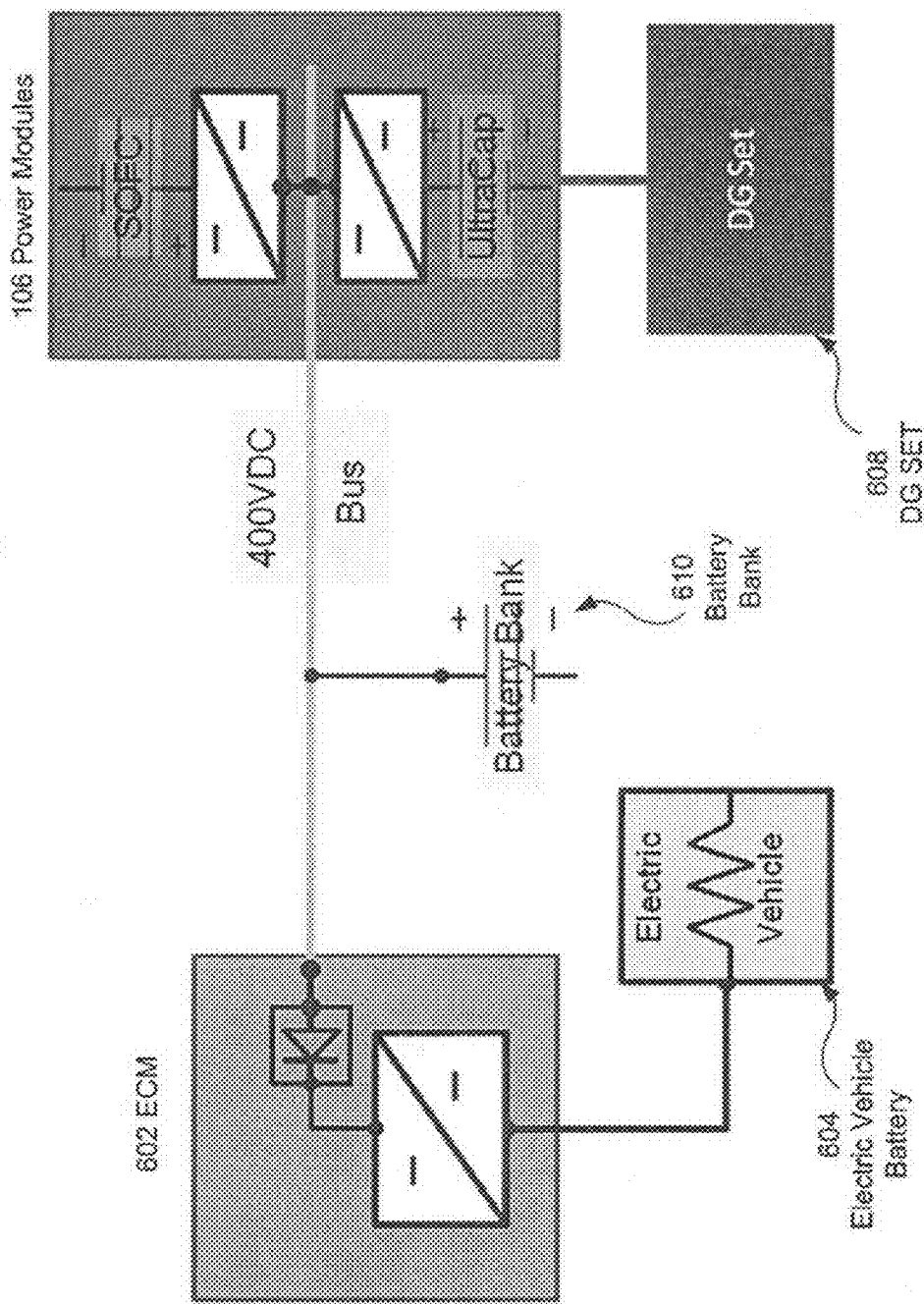

Referring to FIG. 6D, an EV charging station comprises one or more power modules 106 and an ECM 602. This configuration of EV charging stations is suitable for use where there is no grid power and no customer load is to be supplied. The EV charging station is needed only to act as a power source for charging the EV battery 604. In this configuration, a battery bank 610 acts as the base load to the EV charging station. This battery bank 610 may be charged using normal charging (0.1 C). An operator of an EV in need of charging the EV battery 604 may obtain a charge from the ECM 602. Alternatively, the operator may exchange a discharged EV battery 604 for one of the batteries in the battery bank 610. The DG 608 set is used to start up the power modules 106.

In an embodiment, the EV charging station is configured to take advantage of time-of-day pricing and to utilize the storage capacity of the EV batteries. For example, the cost of weekday electricity from 11 AM to 9 PM may be several times (e.g., 5 times) higher than the cost of electricity from 9 PM to 11 AM. In this embodiment, DC power is returned from the EV batteries to the fuel cell system to provide power during peak pricing periods and/or to support shortfalls in the power output from the power modules 106 due to an internal power module 106 fault.

Figure 6E:
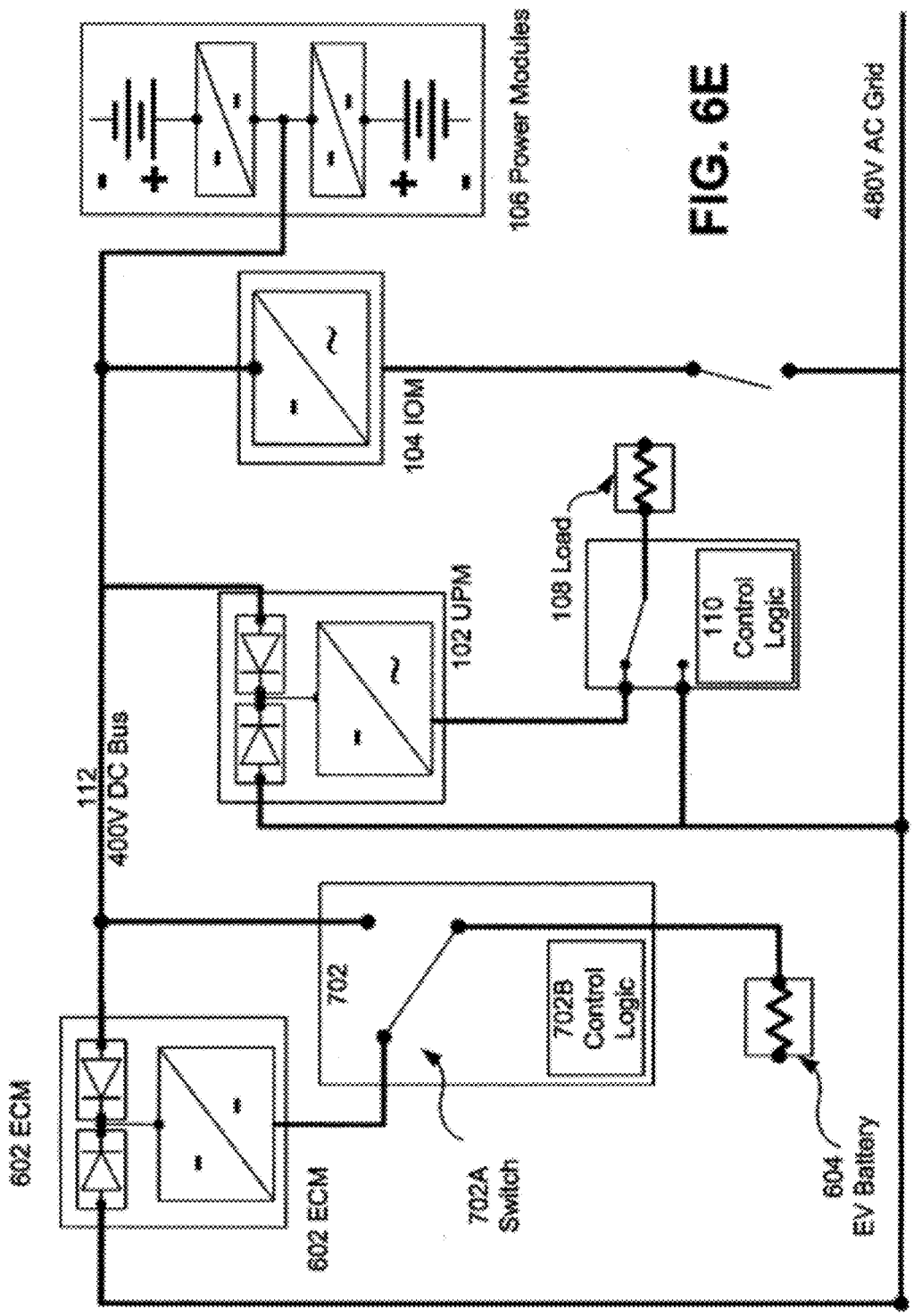

Referring to FIG. 6E, the fuel cell system comprises one or more power modules 106, an IOM 104, a UPM 102, a first control logic unit 110 described above, a switching module 702 containing a switch 702A and second control logic unit 702B, and an ECM 602. If desired, the separate logic units 110 and 702B may be physically combined into a single unit which performs the functions of the unit 110 described above and functions of unit 702B described below. In this embodiment, the power modules 106, IOM 104 and UPM 102 may be used to supply power to a customer load 108 (e.g., a building, such as an office building) while also being able to provide power to the grid, while the ECM 602 may be used for charging an EV battery 604 by drawing power from the 400V DC bus 112. Control logic unit 110 performs the functions as previously described. Control logic unit 702B performs the functions described below. Thus, the UPM 102 and ECM 602 are connected in parallel to the DC bus 112.

In an embodiment, the UPM 102 (e.g., the inverter 102A of UMP 102) is rated higher than would be required to provide power to load 108 from the power modules 106 alone. The additional power handling capabilities are used to utilize additional DC power from EV batteries that are connected to the EV charging station (i.e., to ECM 602). The control logic unit 702B switches the switch 702A to connect the EV batteries 604 to the ECM 602 receive power from ECM 602, or to DC bus 112 to provide power to the DC bus 112.

By way of illustration and not by way of limitation, the fuel cell system contains power module(s) 106 which are capable of delivering a first value of maximum power (e.g., 200 kW). The UMP 102 is rated to convert DC to AC to provide a second value of maximum power (e.g., 400 kW AC) which is greater than the first value. In other words, the inverter 102A is designed to convert more DC to AC power than the power module(s) are capable of providing. The UMP 102 uses the additional conversion capacity to convert DC power (e.g., up to 200 kW DC) from the EV batteries 604 to AC power to provide to the load 108 or to the grid 114.

Thus, DC power from an electric vehicle battery 604 is received at an electric vehicle charging module (ECM) 602 during a period of higher electricity price from the grid, the received power is provided to the at least one inverter 102A which converts the received DC power to AC power, and provides the AC power to a load (e.g., 108 or grid load 114).

In one embodiment, DC power is provided from the at least one fuel cell power module 106 to the ECM 602, and then provided from the ECM to the electric vehicle battery 604 when the cost of electricity is lower, prior to the step of receiving DC power.

The combination EV charging station and fuel cell system may be located at a business having employees that drive electric cars. Using the time of day pricing set forth above, these employees would generally park their EVs at the business recharging docks and connect the EV batteries 604 to the ECM 602 for 8 to 10 hours during the work day. Typically, all the EV batteries 604 are fully charged (with the switch 702A connecting batteries 604 to ECM 602) before the price of power from the grid increases (e.g., by 11 AM) using the power provided from the ECM 602. Then, after the price of the grid power increases (e.g., after 11 AM), logic 702B switches the switch 702A position to connect the EV batteries 604 to the DC bus 112. The batteries 604 are then used to provide a portion (e.g., 10-75%, for example 50%) of their stored charge to the DC bus 112. For example, the EV batteries may receive more charge each day (or each week etc.) than they provide back to the DC bus. If desired, the owners of the EVs may not be charged for the net charge they received or be charged a reduced rate compared to the rate for charging EV batteries from the grid. The charging station could then deliver up to 400 kW AC to load 108 in a peak-shaving load-following manner. All parties would financially benefit because of the increased price of the mid-day electricity.

In another embodiment, the electric vehicle battery is charged at a location other than the ECM 602 during a lower cost electricity price period prior to the step of receiving DC power from the ECM 602 during the higher cost of electricity price period. For example, EVs are charged at a remote location (e.g., from the grid at home overnight) using lower cost, night time electricity. These EVs may then be connected to the ECM 602 in the morning. After the price of electricity increases mid-day (e.g., after 11 AM) the EV batteries 604 deliver a predetermined portion of their stored charge to the DC bus 112. Thus bus can then deliver up to 400 kW AC to load 108 in a peak-shaving load-following manner. The EV owners may be reimbursed for the cost of provided power (i.e., for the power they stored at their home and delivered to the bus 112). Here again all parties financially benefit because of the higher price of mid-day electricity.

Of course, the times used in the foregoing examples are for illustrative purposes only. The charging station may be configured to utilize power from the EV batteries to address the time-of-day pricing for the region in which the charging station is located.

The above described methods and systems can be readily used with multiple generators in parallel with a large load, while allowing tight control of frequency and voltage.

An exemplary modular system which includes a modular enclosure which combination of housings containing several power module housings 106 with the fuel cell containing hot boxes, the IOM 104 housing containing the inverter 104A and other electronics, and an optional housing containing a fuel processing module (which includes, e.g., a desulfurizer, etc.) is described in U.S. Provisional Patent Application Ser. No. 61/386,257, filed Sep. 24, 2010 and entitled "Fuel Cell Mechanical Components", which is incorporated herein by reference in its entirety.

Figure 7:
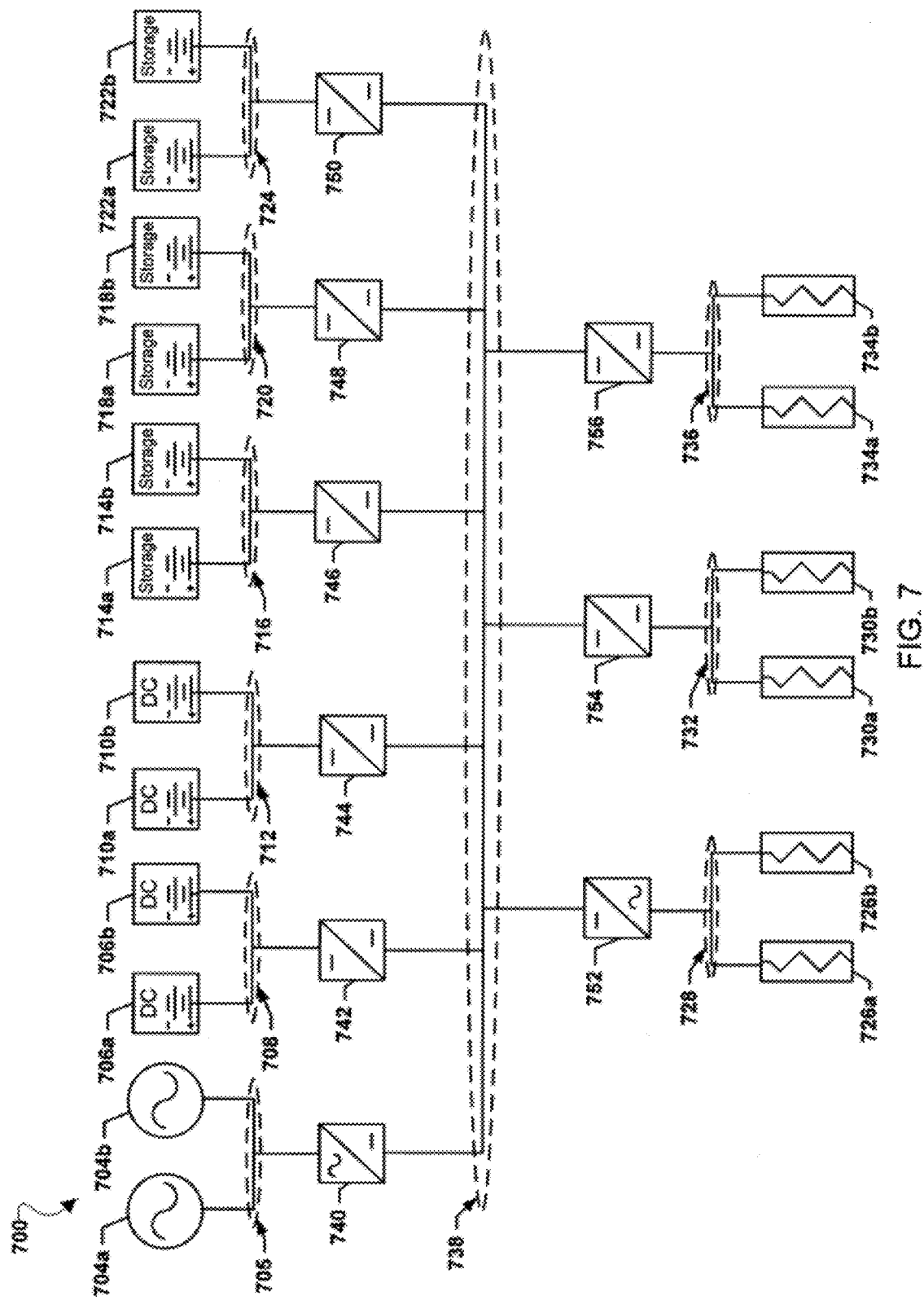
FIGS. 7-10 are block diagrams of DC micro-grids according to the various embodiments.

FIG. 7 illustrates an embodiment direct current (DC) micro-grid 700. The DC micro-grid 700 may include loads 726a, 726b, 730a, 730b, 734a, 734b, power generators 704a, 704b, 706a, 706b, 710a, 710b, and energy storage devices 714a, 714b, 718a, 718b, 722a, 722b coupled to a common DC bus 738.

Power generators 704a and 704b may be any type alternating current (AC) generators, such as micro turbines, wind turbines, distributed diesel generators, etc. and/or connections to an AC utility power grid. Power generators 706a, 706b, 710a, and 710b, may be any type DC generators, such as fuel cell systems (e.g., SOFC fuel cell systems), modular energy generation system, solar cells, etc. In an embodiment, power generators 704a, 704b, 706a, 706b, 710a, 710b may be of different voltages and/or waveforms, such as 380 volt DC power generators, 480 volt AC power generators, and/or −48 volt DC power generators, and may be grouped by voltage and/or waveform, such as 480 volt AC power generators 704a and 704b grouped together, 380 volt DC power generators 706a and 706b grouped together, and −48 volt DC power generators 710a and 710b grouped together.

In an embodiment, different power generation buses for each voltage and/or waveform grouping may be created to deliver and/or draw power from each power generation group. Grouped AC power generators 704a and 704b may be coupled to power generation bus 705, grouped DC power generators 706a and 706b may be coupled to power generation bus 708, and grouped DC power generators 710a and 710b may be coupled to power generation bus 712.

In an embodiment, the power generation buses 705, 708, and 712 may be coupled to the common DC bus 738. In an embodiment, the power generation buses 705, 708, and 712 may be coupled to the common DC bus 738 via power electronics devices 740, 742, and 744, respectively. Power electronics devices 740, 742, and 744 may be power conversion devices, such as AC/DC converters (e.g., inverters), DC/DC converters, and/or DC/AC converters (e.g., inverters), coupled to the power generation buses 705, 708, and 712 and coupled to the common DC bus 738. Power electronics devices 740, 742, and 744 may transfer power from/to the power generation buses 705, 708, and 712 to/from the common DC bus 738. Power electronics devices 740, 742, and 744 may be configured to filter (e.g., isolate) injected signals in the common DC bus 738 such that the injected signals do not pass along to the power generation buses 705, 708, and 712. For example, power electronics devices 742 and 744 may be isolated DC/DC converters. Power electronics devices 740, 742, and 744 may contain hardware to enable power generation buses 705, 708, and 712 to be disconnected, individually or as a group, from the common DC bus 738, such as in response to a trigger signal. Power electronics devices 740, 742, and 744 may be fully isolated devices, providing galvanic isolation between the common DC bus 738 and the power generation buses 705, 708, 712, such as full bridge DC/DC converters, half bridge DC/DC converters, and/or resonant DC/DC converters. In an embodiment, all the power electronics devices 740, 742, and 744 may provide isolation. In another embodiment, only a portion, or none, of the power electronics devices 740, 742, and 744 may provide isolation as long as isolation between the loads 726a, 726b, 730a, 730b, 734a, 734b of the DC micro-grid 700 and the power generators 704a, 704b, 706a, 706b, 710a, 710b and energy storage devices 714a, 714b, 718a, 718b, 722a, 722b of the DC micro-grid 700 is provided at least at one point in the DC micro-grid 700.

In an embodiment, power electronics device 740 may be an AC/DC converter coupling the power generation bus 705 to the common DC bus 738. In operation, power electronics device 740 may convert AC received from the power generation bus 705 to DC provided to the common DC bus, or vice versa. Additionally, the power electronics device 740 may increase or decrease the voltage and/or current of the energy received from and/or sent to the power generation bus 705 and/or the common DC bus 738. In an embodiment, the power electronics device 740 may be a high efficiency isolation transformer, such as a hexaformer, which may provide isolation between the AC power generation bus 705 and the common DC bus 738. In an embodiment, power electronics device 742 may be a DC/DC converter coupling the power generation bus 708 to the common DC bus 738. In operation, the power electronics device 742 may increase or decrease the voltage and/or current of the energy received from and/or sent to the power generation bus 708 and/or the common DC bus 738. In an embodiment, power electronics device 744 may be a DC/DC converter coupling the power generation bus 712 to the common DC bus 738. In operation, the power electronics device 744 may increase or decrease the voltage and/or current of the energy received from and/or sent to the power generation bus 712 and/or the common DC bus 738. In other words, power electronics devices 742 and 744 may be buck or boost converters.

Energy storage devices 714a, 714b, 718a, 718b, 722a, and 722b, may be any type energy storage devices, such as batteries, ultracapcitors, etc. In an embodiment, energy storage devices 714a, 714b, 718a, 718b, 722a, and 722b may be of different voltages, such as 480 volts, 380 volts and/or −48 volts, and may be grouped by voltage, such as 480 volt energy storage devices 714a and 714b grouped together, 380 volt energy storage devices 718a and 718b grouped together, and −48 volt energy storage devices 722a and 722b grouped together.

In an embodiment, different energy storage buses for each voltage and/or waveform grouping may be created to deliver and/or draw power from each energy storage device grouping. Grouped energy storage devices 714a and 714b may be coupled to energy storage bus 716, grouped energy storage devices 718a and 718b may be coupled to energy storage bus 720, and grouped energy storage devices 722a and 722b may be coupled to energy storage bus 724. In a further alternative embodiment, loads (e.g., loads 726a, 726b, 730a, 730b, 734a, 734b and/or other loads) with voltage and waveform requirements that exactly match the voltage and waveform of power generation buses 705, 708, and/or 712 and/or energy storage buses 716, 720, and/or 724 may be directly connected to the power generation buses 705, 708, and/or 712 and/or energy storage buses 716, 720, and/or 724, rather than applied to the common DC bus 738. In such an embodiment, control schemes as discussed herein applied to the common DC bus 738 may also be applied to the power generation buses 705, 708, and/or 712 and/or energy storage buses 716, 720, and/or 724. Additionally, in such an embodiment, the power electronics devices 740, 742, 744, 746, 748, and/or 750 may be bidirectional devices configured to provide power to and/or draw power from the power generation buses 705, 708, and/or 712 and/or energy storage buses 716, 720, and/or 724.

In an embodiment, the energy storage buses 716, 720, and 724 may be coupled to the common DC bus 738. In an embodiment, the energy storage buses 716, 720, and 724 may be coupled to the common DC bus 738, via power electronics devices 746, 748, and 750, respectively. Power electronics devices 746, 748, and 750 may be power conversion devices, such as AC/DC converters, DC/DC converters, and/or DC/AC converters, coupled to the energy storage buses 716, 720, and 724 and coupled to the common DC bus 738. Power electronics devices 746, 748, and 750 may transfer power from/to the energy storage buses 716, 748, and 712 from/to the common DC bus 738. Power electronics devices 746, 748, and 750 may be configured to filter injected signals in the common DC bus 738 such that the injected signals do not pass along to the energy storage buses 716, 720, and 724. Power electronics devices 746, 748, and 750 may contain hardware to enable energy storage buses 716, 720, and 724 to be disconnected, individually or as a group, from the common DC bus 738, such as in response to a trigger signal. Power electronics devices 746, 748, and 750 may be fully isolated devices, providing galvanic isolation between the common DC bus 738 and the energy storage buses 716, 720, 724, such as full bridge DC/DC converters, half bridge DC/DC converters, and/or resonant DC/DC converters. In an embodiment, all the power electronics devices 746, 748, and 750 may provide isolation. In another embodiment, only a portion, or none, of the power electronics devices 746, 748, and 750 may provide isolation as long as isolation between the loads 726a, 726b, 730a, 730b, 734a, 734b of the DC micro-grid 700 and the power generators 704a, 704b, 706a, 706b, 710a, 710b and energy storage devices 714a, 714b, 718a, 718b, 722a, 722b of the DC micro-grid 700 is provided at least at one point in the DC micro-grid 700.

In an embodiment, power electronics device 746 may be a DC/DC converter coupling the energy storage bus 716 to the common DC bus 738. In operation, power electronics device 746 may increase or decrease the voltage and/or current of the energy received from and/or sent to the energy storage bus 716 and/or the common DC bus 738. In an embodiment, power electronics device 746 may control the charging and/or discharge of the energy storage devices 714a and/or 714b. In an embodiment, power electronics device 748 may be a DC/DC converter coupling the energy storage bus 720 to the common DC bus 738. In operation, the power electronics device 748 may increase or decrease the voltage and/or current of the energy received from and/or sent to the energy storage bus 720 and/or the common DC bus 738. In an embodiment, power electronics device 748 may control the charging and/or discharge of the energy storage devices 718a and/or 718b. In an embodiment, power electronics device 750 may be a DC/DC converter coupling the energy storage bus 724 to the common DC bus 738. In operation, the power electronics device 750 may increase or decrease the voltage and/or current of the energy received from and/or sent to the energy storage bus 724 and/or the common DC bus 738. In an embodiment, power electronics device 750 may control the charging and/or discharge of the energy storage devices 722a and/or 722b.

Loads 726a and 726b may be any type alternating current (AC) loads, such as information technology (IT) loads (i.e., a device and/or devices operating in an IT system, such as a data center), electric vehicle loads, medical device loads, AC motors, etc. Loads 730a, 730b, 734a, and 734b, may be any type DC loads, such as information technology (IT) loads, electric vehicle loads, medical device loads, DC motors, etc. IT loads, (i.e., devices operating in an IT system) may include one or more of computer(s), server(s), router(s), rack(s), power supply connections, and other components found in a data center environment. In an embodiment, loads 726a, 726b, 730a, 730b, 734a, 734b may be of different voltages and/or waveforms, such as 380 volt DC loads, 480 volt AC loads, and/or −48 volt DC loads, and may be grouped by voltage and/or waveform, such as 480 volt AC loads 726a and 726b grouped together, 380 volt DC loads 730a and 730b grouped together, and −48 volt DC loads 734a and 734b grouped together.

In an embodiment, different load buses for each voltage and/or waveform grouping may be created to deliver and/or draw power from each load group. Grouped AC loads 726a and 726b may be coupled to load bus 728, grouped DC loads 730a and 730b may be coupled to load bus 732, and grouped DC loads 734a and 734b may be coupled to load bus 736.

In an embodiment, the load buses 728, 732, and 736 may be coupled to the common DC bus 738. In an embodiment, the load buses 728, 732, and 736 may be coupled to the common DC bus 738 via power electronics devices 752, 754, and 756, respectively. Power electronics devices 752, 754, and 756 may be power conversion devices, such as AC/DC converters, DC/DC converters, and/or DC/AC converters, coupled to the load buses 728, 732, and 736 and coupled to the common DC bus 738. Power electronics devices 752, 754, and 756 may transfer power from/to the load buses 728, 732, and 736 to/from the common DC bus 738. Power electronics devices 752, 754, and 756 may be configured to filter injected signals in the common DC bus 738 such that the injected signals do not pass along to the load buses 728, 732, and 736. Power electronics devices 752, 754, and 756 may contain hardware to enable load buses 728, 732, and 736 to be disconnected, individually or as a group, from the common DC bus 738, such as in response to a trigger signal. Power electronics devices 752, 754, and 756 may be fully isolated devices, providing galvanic isolation between the common DC bus 738 and the load buses 728, 732, and 736, such as full bridge DC/DC converters, half bridge DC/DC converters, resonant DC/DC converters, DC/AC converters, and/or hexaformers. In an embodiment, all the power electronics devices 752, 754, and 756 may provide isolation. In another embodiment, only a portion, or none, of the power electronics devices 752, 754, and 756 may provide isolation as long as isolation between the loads 726a, 726b, 730a, 730b, 734a, 734b of the DC micro-grid 700 and the power generators 704a, 704b, 706a, 706b, 710a, 710b and energy storage devices 714a, 714b, 718a, 718b, 722a, 722b of the DC micro-grid 700 is provided at least at one point in the DC micro-grid 700.

In an embodiment, power electronics device 752 may be a DC/AC converter coupling the load bus 728 to the common DC bus 738. In operation, power electronics device 752 may convert DC received from the common DC bus to AC. Additionally, the power electronics device 752 may increase or decrease the voltage and/or current of the energy received from the common DC bus 738 before sending it to the load bus 728. In an embodiment, the power electronics device 752 may be a high efficiency isolation transformer, such as a hexaformer, which may provide isolation between the AC load bus 728 and the common DC bus 738. In an embodiment, power electronics device 754 may be a DC/DC converter coupling the load bus 732 to the common DC bus 738. In operation, the power electronics device 754 may increase or decrease the voltage and/or current of the energy received from the common DC bus 738 before sending it to the load bus 732. In an embodiment, power electronics device 756 may be a DC/DC converter coupling the load bus 736 to the common DC bus 738. In operation, the power electronics device 756 may increase or decrease the voltage and/or current of the energy received from the common DC bus 738 before sending it to the load bus 736.

In an embodiment, the common DC bus 738 may be a bus which ties the power generator buses 705, 708, and 712, the energy storage buses 716, 720, and 724, and the load buses 728, 732, and 736 together. The common DC bus 738 may be controlled such that the power requirement for the loads 726a, 726b, 730a, 730b, 734a, and 734b is maintained such that:

i. $P(\text{to storages}) = P(\text{generators}) - P(\text{loads})$, if $P(\text{generators}) > P(\text{loads})$; or ii. $P(\text{from storages}) = P(\text{loads}) - P(\text{generators})$, if $P(\text{generators}) < P(\text{loads})$, where P is Power.

In an embodiment, the common DC bus 738 may be controlled to optimize for absolute value, such that the value of the P(generators)–P(loads) is equal to zero. In an embodiment, the common DC bus 738 may be optimized by holding the power output of the power generators 704a, 704b, 706a, 706b, 710a, 710b constant and using the energy storage devices 714a, 714b, 718a, 718b, 722a, 722b to buffer diurnal load transients, while the power output of the power generators 704a, 704b, 706a, 706b, 710a, 710b may only be increased and/or decreased when the load pattern diverges from its typical diurnal cycle. In another embodiment, the common DC bus 738 may be optimized by constantly driving the power output of the power generators 704a, 704b, 706a, 706b, 710a, 710b upward and/or downward to match the power requirements of the loads 726a, 726b, 730a, 730b, 734a, and 734b as best as possible based on rate of change limitations of the power generators 704a, 704b, 706a, 706b, 710a, 710b. In an embodiment, the voltage of the common DC bus 738 may be set to the highest voltage of the generator buses 705, 708, and 712, the energy storage buses 716, 720, and 724, and/or the load buses 728, 732, and 736. The voltage of any AC buses may be determined as the DC equivalent voltage for that respective bus. The setting of the common DC bus 738 voltage to the highest voltage of the buses 705, 708, 712, 716, 720, 724, 728, 732, or 736 may optimize the operation of the DC micro-grid 700 and minimize conductor costs in the DC micro-grid 700. In an embodiment, the voltage of the common DC bus 738 may be set to the most common of the voltages (i.e., the mode, rather than the mean or median voltage) of the generator buses 705, 708, and 712, the energy storage buses 716, 720, and 724, and/or the load buses 728, 732, and 736. The voltage of any AC buses may be determined as the DC equivalent voltage for that respective bus. The setting of the common DC bus 738 voltage to the most common voltage of the buses 705, 708, 712, 716, 720, 724, 728, 732, or 736 may optimize the operation of the DC micro-grid 700 and minimize conversion losses in the DC micro-grid 700. When the common DC bus 738 and load buses 728, 732, and/or 736 are selected to be less than 380 volts DC, such as –48 volts DC, small DC/DC converters may be provided within the power generators 704a, 704b, 706a, 706b, 710a, 710b to provide higher voltages for auxiliary devices (e.g., balance of plant pumps, blowers, etc.) with the power generators 704a, 704b, 706a, 706b, 710a, 710b. In an embodiment, a controller and/or scheduler may control the voltage of the common DC bus 738. In an embodiment, the operation of the power electronic devices 740, 742, 744, 746, 748, 750, 752, 754, and/or 756 may control the voltage of the common DC bus 738. In another embodiment, a separate bus controller device may control the voltage of the common DC bus 738, as will be discussed below with respect to FIG. 9.

Figure 8:
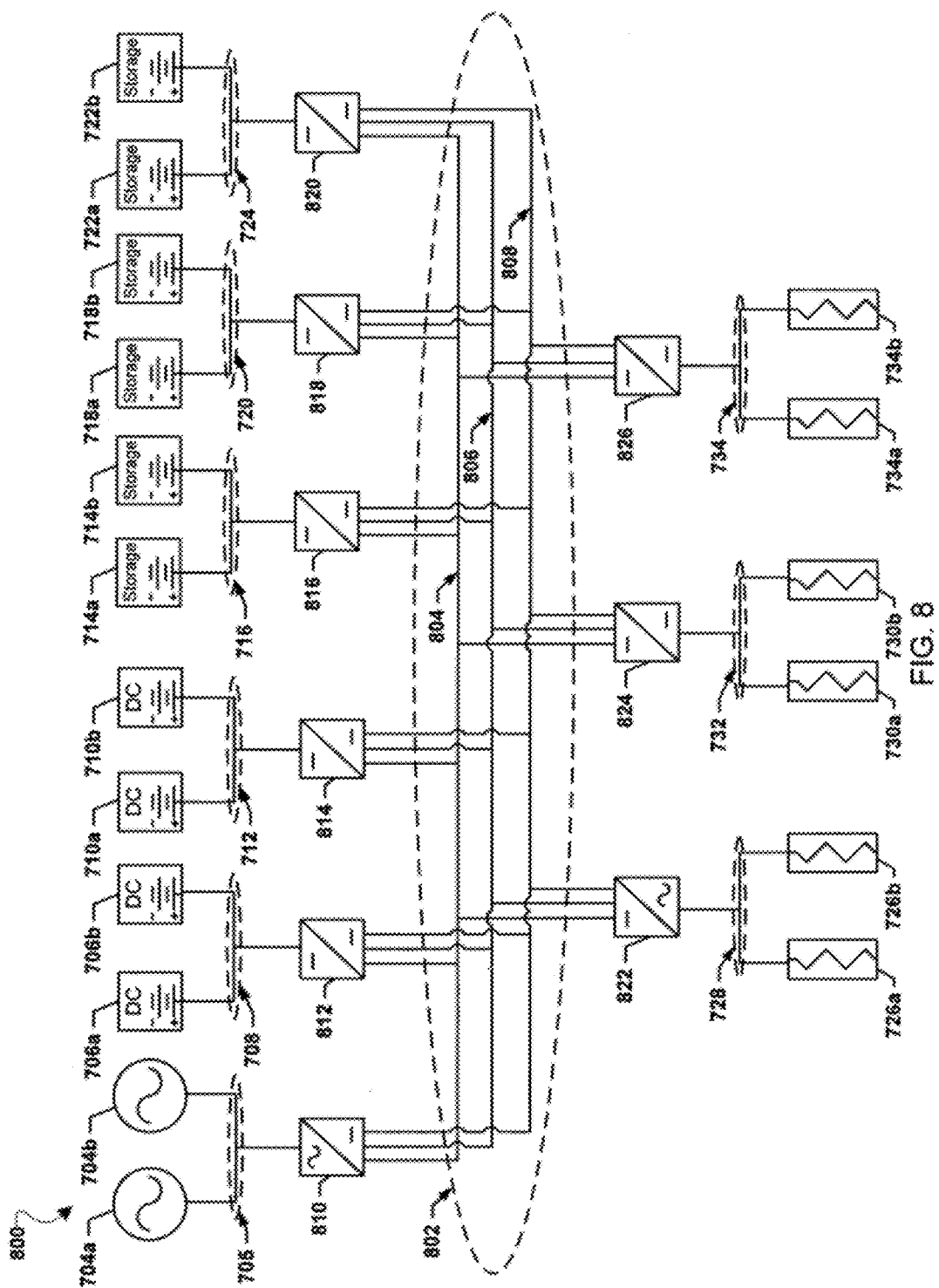

FIG. 8 illustrates an embodiment direct current (DC) micro-grid 800. The DC micro-grid 800 is similar to the DC micro-grid 700 illustrated in FIG. 7 and contains a number of components in common. Those components which are common to both DC micro-grids 700 and 800 are numbered with the same numbers in FIGS. 7 and 8 and will not be described further.

One difference between the DC micro-girds 800 and 700 is that DC micro-grid 800 may include a common DC bus 802 in a split bus configuration. The common DC bus 802 may have more than one conductor, for example three conductors 804, 806, and 808. In an embodiment, the three conductors 804, 806, and 808 may be set to different voltages. For example, the conductor 804 may be at +380 volts DC, the conductor 806 may be neutral and the conductor 808 may be at –380 volts DC. Power electronics devices 810, 812, 814, 816, 818, 820, 822, 824, and 826 may be similar to power electronics devices 740, 742, 744, 746, 748, 750, 752, 754, and 756 discussed above with reference to FIG. 7, except that power electronics devices 810, 812, 814, 816, 818, 820, 822, 824, and 826 may include more than one conductor for sending/receiving power to/from the common DC bus 802. As an example, each of the power electronics devices 810, 812, 814, 816, 818, 820, 822, 824, and 826 may include three connections to the common DC bus 802, such as a first connection to the conductor 804, a second connection to the conductor 806, and a third connection to the conductor 808. In an embodiment, the power electronics devices 810, 812, 814, 816, 818, 820, 822, 824, and 826 may be configured to output different voltages on each connection to the common DC bus 802, for example +380 volts DC may be output on the first connection, the second connection may be neutral, and –380 volts DC may be output on the third connection. While illustrated as a three conductor split bus, common DC bus 802 may have more or less than three conductors and the power electronics devices 810, 812, 814, 816, 818, 820, 822, 824, and 826 may have more or less than three connections to the common DC bus 802.

Figure 9:
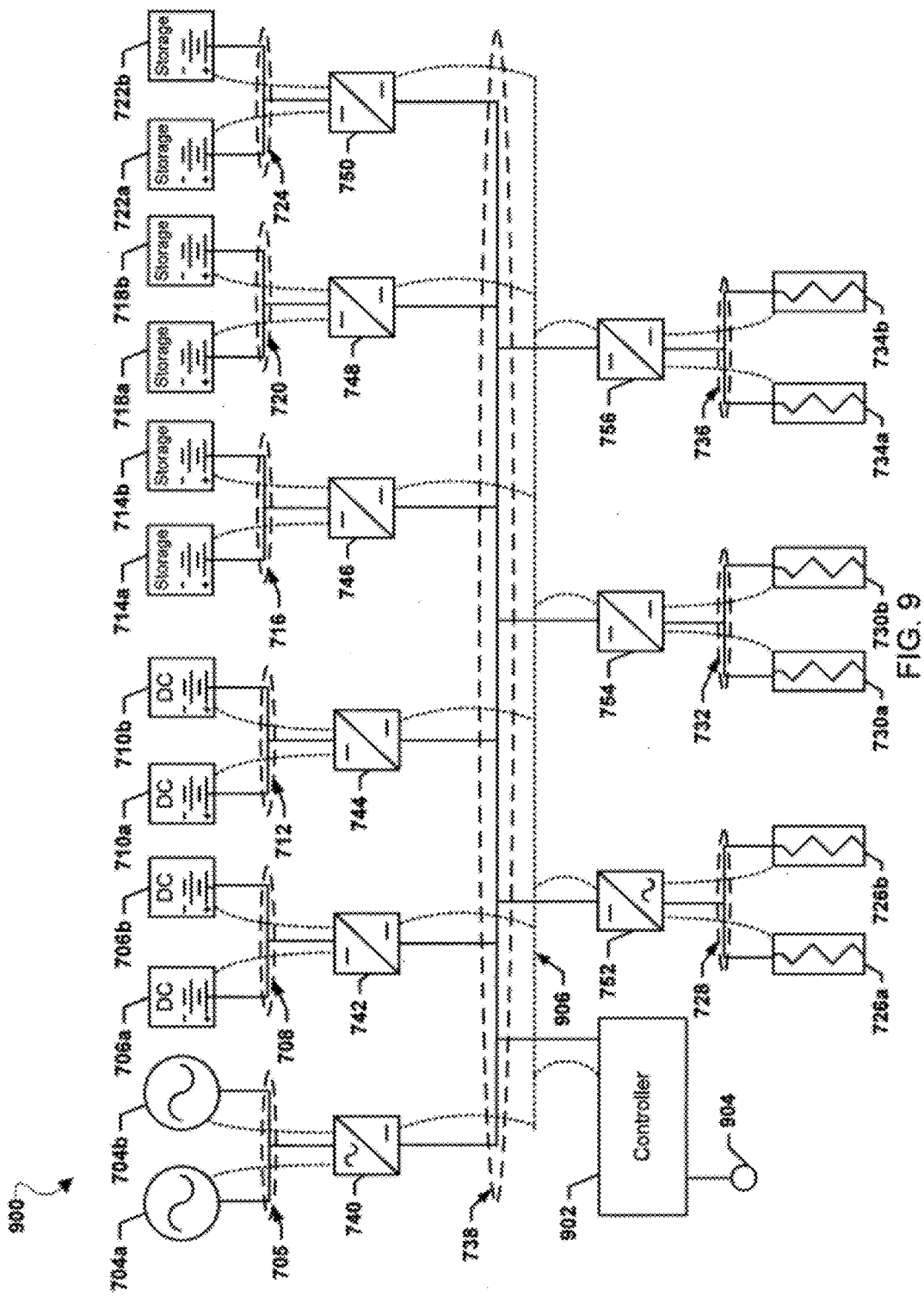

FIG. 9 illustrates an embodiment direct current (DC) micro-grid 900. The DC micro-grid 900 is similar to the DC micro-grid 700 illustrated in FIG. 7 and contains a number of components in common. Those components which are common to both DC micro-grids 700 and 900 are numbered with the same numbers in FIGS. 7 and 9 and will not be described further.

One difference between the DC micro-girds 900 and 700 is that DC micro-grid 900 may include a controller 902 for communicating with the various devices in the DC micro-grid 900 and for controlling/scheduling the operation the various devices in the DC micro-grid 900. In an embodiment, the controller 902 may include a connection 904 to a communication network (e.g., a cellular, Wi-Fi, Ethernet, or other connection to the Internet) for sending/receiving information with devices/systems/entities, such as public utilities, fuel dispatchers, DC micro-grid 900 operators, DC micro-grid 900 devices (e.g., the various power generators, energy storage devices, loads, and/or power electronics devices, etc. comprising the DC micro-grid 900), emergency response personnel, etc. In this manner, information may be exchanged between the devices/systems/entities and the controller 902. In an embodiment, the various power generators, energy storage devices, loads, and/or power electronics devices, etc. comprising the DC micro-grid 900 may include wired and/or wireless modems and logic to enable communication between the controller 902 and various DC micro-grid 900 devices and various logic and controls (e.g., switches, transistors, relays, etc.) to enable the various DC micro-grid 900 devices to perform operations (such as power output changes, start-ups, shut downs, disconnects, discharges, etc.) in response to signals received from the controller 902. In this manner, the controller DC m may control the operations of the various DC micro-grid 900 devices via wired or wireless communication. In an optional embodiment, the controller 902 may be connected to the devices in the DC micro-grid 900 by a series of wires 906, such as electrical and/or fiber optic transmission lines, placed in parallel to the wiring of the inputs/outputs to/from the common DC bus 738. The series of wires 906 may connect the controller 902 to the loads 726a, 726b, 730a, 730b, 734a, 734b, power generators 704a, 704b, 706a, 706b, 710a, 710b, energy storage devices 714a, 714b, 718a, 718b, 722a, 722b, and/or power electronics devices 740, 742, 744, 746, 748, 750, 752, 754, and 756. In this manner, cascaded signals may be passed from the controller 902 to the various devices in the DC micro-grid 900 via the series of wires 906 to control the operations of the loads 726a, 726b, 730a, 730b, 734a, 734b, power generators 704a, 704b, 706a, 706b, 710a, 710b, energy storage devices 714a, 714b, 718a, 718b, 722a, 722b, and/or power electronics devices 740, 742, 744, 746, 748, 750, 752, 754, and 756, individually or as groups. As examples, communications signals from the controller 902 received via the series of wires 906 may indicate to a fuel cell generator 706b to go off line, may switch storage devices 722a and 722b from charge to discharge mode, and/or may direct power electronics device 756 to disconnect load bus 736 from the common DC bus 738.

In an embodiment, signals (e.g., DC pulses) may be injected by the controller 902 into the common DC bus 738. The signals injected into the common DC bus 738 may have specific waveforms. In an embodiment, the signals injected into the common DC bus 738 may serve as triggers to indicate to the loads 726a, 726b, 730a, 730b, 734a, 734b, the power generators 704a, 704b, 706a, 706b, 710a, 710b, and/or the energy storage devices 714a, 714b, 718a, 718b, 722a, 722b to shutdown and/or disconnect from the common DC bus 738. The loads 726a, 726b, 730a, 730b, 734a, 734b, the power generators 704a, 704b, 706a, 706b, 710a, 710b, and/or the energy storage devices 714a, 714b, 718a, 718b, 722a, 722b may include communication devices (e.g., modems), logic, and controls (e.g., switches, transistors, relays, etc.) to enable shutdown and/or disconnect from the common DC bus 738 in response to signals injected into the common DC bus 738. In an embodiment, different waveforms may trigger different devices to disconnect from the common DC bus 738. In an embodiment, the injected signals may pass through the various power electronics devices 740, 742, 744, 746, 748, 750, 752, 754, and 756 to the respective loads 726a, 726b, 730a, 730b, 734a, 734b, power generators 704a, 704b, 706a, 706b, 710a, 710b, and/or energy storage devices 714a, 714b, 718a, 718b, 722a, 722b. In an alternative embodiment, the injected signals may be filtered by the power electronics devices 740, 742, 744, 746, 748, 750, 752, 754, and 756 such that the injected signals do not pass through and affect the power quality of the various downstream buses 705, 708, 712, 716, 720, 724, 728, 732, and 736. The injected signals on the common DC bus 738 may provide individual and/or synchronized commands to control the operations of the loads 726a, 726b, 730a, 730b, 734a, 734b, power generators 704a, 704b, 706a, 706b, 710a, 710b, energy storage devices 714a, 714b, 718a, 718b, 722a, 722b, and/or power electronics devices 740, 742, 744, 746, 748, 750, 752, 754, and 756, individually or as groups. As an example, the injected signals on the common DC bus 738 may be watchdog signals (e.g., standard repeated timing signals, the absence of which may indicate a fault), and if synchronization to the watchdog signals is lost, then the loads 726a, 726b, 730a, 730b, 734a, 734b, power generators 704a, 704b, 706a, 706b, 710a, 710b, energy storage devices 714a, 714b, 718a, 718b, 722a, 722b, and/or power electronics devices 740, 742, 744, 746, 748, 750, 752, 754, and 756 may be configured to disconnect from the common DC bus 738.

In an embodiment, the various power electronics devices 740, 742, 744, 746, 748, 750, 752, 754, and 756 may be DC/DC, AC/DC, and/or DC/AC converters containing hardware to enable them to disconnect individually from the common DC bus 738 in response to communication signals (e.g., communication signals received from the controller 902 via wires 906, wireless form the controller 902 via a wireless connection 904, and/or signals injected into the common DC bus 738). The various power electronics devices 740, 742, 744, 746, 748, 750, 752, 754, and 756 may include communication devices (e.g., modems), logic, and controls (e.g., switches, transistors, relays, etc.) to enable shutdown and/or disconnect from the common DC bus 738 in response to communication signals. The disconnect of individual power electronics devices 740, 742, 744, 746, 748, 750, 752, 754, or 756 may enable the DC micro-grid 900 to continue operations with one or more power generators, storage devices, and/or loads removed.

In an embodiment, the loads 726a, 726b, 730a, 730b, 734a, 734b, power generators 704a, 704b, 706a, 706b, 710a, 710b, energy storage devices 714a, 714b, 718a, 718b, 722a, 722b, and/or power electronics devices 740, 742, 744, 746, 748, 750, 752, 754, and 756 may be configured to communicate with each other and/or the controller 902 over the common DC bus 738 via signals, such as load commands, operation feedback, etc., injected onto the common DC bus 738, over wires 906 via signals sent over wires 906, and/or wirelessly via wireless links, such as cellular network links. In this manner, communication over the common DC bus 738, wires 906, or wirelessly may balance power generation, storage, and/or use in the DC micro-grid 900. In an embodiment in which the power requirements of the loads 726a, 726b, 730a, 730b, 734a, and 734b may be time dependent, communication signals may be used to optimize the configuration of the DC micro-grid 900 based on likely load events which may create transient power requirements. As an example, at a certain time of day, such as during factory load start-up, larger power requirements may be needed and communication signals may cause the power output of the DC micro-grid 900 to be increased. As another example, in an embodiment in which the DC micro-grid 900 provides power to IT loads, a significant press release may drive large search engine demands and the communication signals may cause the power output of the DC micro-grid 900 to be increased. In an embodiment, communication signals may be utilized to communicate device alarms. As an example, the controller 902 may store the geographic location of each device in the DC micro-grid 900, and if a fire occurs in one device, for example power generator 710b, the controller 900 may signal other devices in close physical proximity to shut down, such as power generator 710a and power electronics device 744. Other devices physically separated from the device on fire may remain in operation. In an embodiment, communication signals may be sent from one load, such as load 726a to another load, such as 734b, via the common DC bus 738, wires 906, and/or wirelessly to coordinate functions within a region or site. In an embodiment, communication signals may be encrypted and/or may include authentication keys. In this manner, unauthorized use of the DC micro-grid 900 may not occur.

In an embodiment, a digital addressing scheme may be used in the signals injected onto the common DC bus 738. As an example, the signals may include address bits, data bits, and check sum bits. In an embodiment, frequency and/or amplitude modulation may be used for addressing.

In an embodiment, the controller 902 may be function as a scheduler in communication with the loads 726a, 726b, 730a, 730b, 734a, 734b, power generators 704a, 704b, 706a, 706b, 710a, 710b, energy storage devices 714a, 714b, 718a, 718b, 722a, 722b, and power electronics devices 740, 742, 744, 746, 748, 750, 752, 754, and 756 and configured to optimize the operation of the loads 726a, 726b, 730a, 730b, 734a, 734b, power generators 704a, 704b, 706a, 706b, 710a, 710b, energy storage devices 714a, 714b, 718a, 718b, 722a, 722b, and power electronics devices 740, 742, 744, 746, 748, 750, 752, 754, and 756. As a scheduler the controller 902 may communicate with the power generators 704a, 704b, 706a, 706b, 710a, 710b to coordinate load steps, coordinate warm up times, optimize efficiency (e.g., peaking with the most efficient peaking device), coordinate fuel supplies (e.g., ramping down usage of a generator which has a failing or limited fuel supply), and manage the cost of power generation (e.g., selecting the least expensive combination of generators to operate). As a scheduler the controller 902 may communicate with the energy storage devices 714a, 714b, 718a, 718b, 722a, 722b to manage the state of the charge, manage the cost of generator or grid power in an arbitrage format, and manage round trip efficiency of different storage devices by scheduling optimization. As a scheduler the controller 902 may communicate with the loads 726a, 726b, 730a, 730b, 734a, 734b to manage load criticality (e.g., balancing the criticality of loads versus available energy such that the least critical loads are switched off first if energy availability is limited), manage load start up (e.g., ramping generators and/or storage outputs to match load requirement increases), and manage load shut downs (e.g., ramping generators and/or storage outputs to match load requirement decreases). In an embodiment, the controller 902 may dispatch fuel storage to various power generators (e.g., using connection 904 to a communication network) if generator performance crashes, signals from the generator indicate a failing supply of one fuel source (e.g., a failing pipeline pressure or failing tank level), and/or in response to signals from the utility (e.g., messages indicating that pipeline supply may be impacted by a natural gas grid infrastructure issue). In this manner, additional fuel may be supplied to the various power generators from fuel storage sources (e.g., on-site truck delivery, on-site reserve tank storage, etc) to avoid power generation interruptions.

In an embodiment, the controller 902 may be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Figure 10:
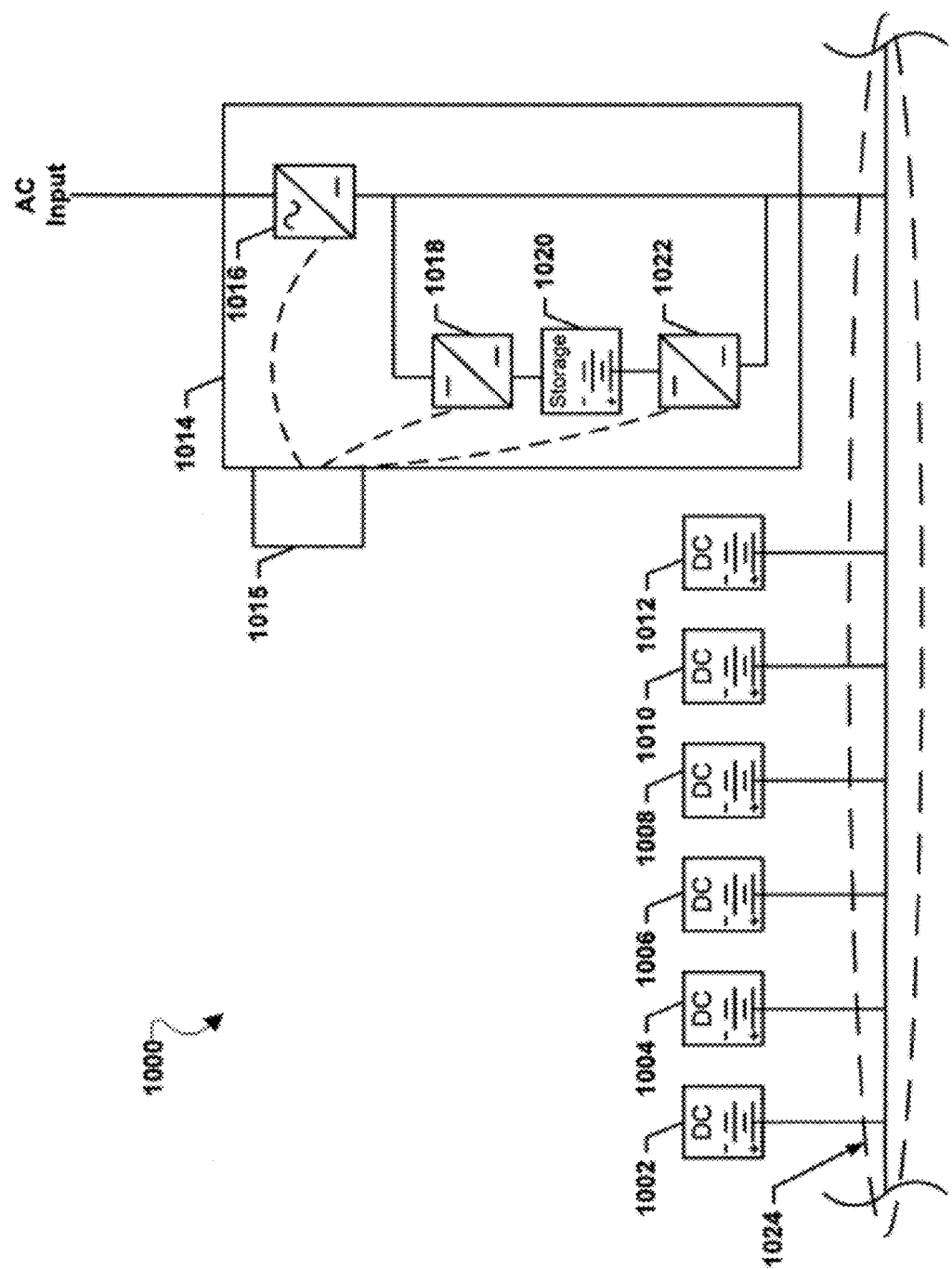

FIG. 10 illustrates an embodiment direct current (DC) micro-grid portion 1000. In an embodiment, the DC micro-grid portion 1000 may be a portion of DC micro-grids 700, 800, and/or 900 discussed above. The DC micro-grid portion 1000 may include DC generators 1002, 1004, 1006, 1008, 1010, 1012, an energy storage device 1014, and a common DC bus 1024. In an embodiment, the output of the DC generators 1002, 1004, 1006, 1008, 1010, and 1012 may be + or −380 volts DC to the common DC bus 1024. In an embodiment, the energy storage device 1014 may include an AC/DC converter 1016 for converting an AC input, such as an AC grid input, to DC, a charge module 1018 (e.g., a DC/DC converter, such as a boost or buck converter), one or more storage devices 1020, and a discharge module 1022 (e.g., a DC/DC converter, such as a boost or buck converter). In an embodiment, the AC/DC converter 1016, charge module 1018, and/or discharge module 1022 may be in communication with a controller 1015. The controller 1015 may be part of the energy storage device 1014 or may be a separate device, such as an overall controller of the DC micro-grid 1000 similar to controller 902 discussed above with reference to FIG. 9. The controller 1015 may control the operation of the AC/DC converter 1016, charge module 1018, and/or discharge module 1022 via signals sent to controls (e.g., switches, transistors, relays, etc.) within the AC/DC converter 1016, charge module 1018, and/or discharge module 1022. The output of the AC/DC converter 1016 may be coupled to the common DC bus 1024 and coupled to the charge module 1018. The charge module 1018 may be coupled to the storage device 1020 which may be coupled to the discharge module 1022. The output of the discharge module 1022 may be coupled to the output of the AC/DC converter 1016 and thereby, coupled to the common DC bus 1024. The output of the energy storage device 1014 may be + or −380 volts DC output to the common DC bus 1024. In operation the energy storage module 1014 may receive an AC input. The AC/DC converter 1016 may convert the AC input to DC. The AC/DC converter 1016 may output DC, such as + or −380 volt DC to the charge module 1018 and/or common DC grid 1024. In this manner, the AC/DC converter 1016 may rectify the AC input to provide power to the common DC bus 1024, such as during surges in demand on the common DC bus 1024. The charge module 1018 may receive the DC output from the AC/DC converter 1016 and may provide DC to the storage device 1020 to charge the storage device 1020. In this manner, the storage device 1020 may store energy. The storage device 1020 may output energy to the common DC bus 1024 via the discharge module 1022, which may be configured to provide DC from the storage device 1020 to the common DC bus 1024.

Figure 11:
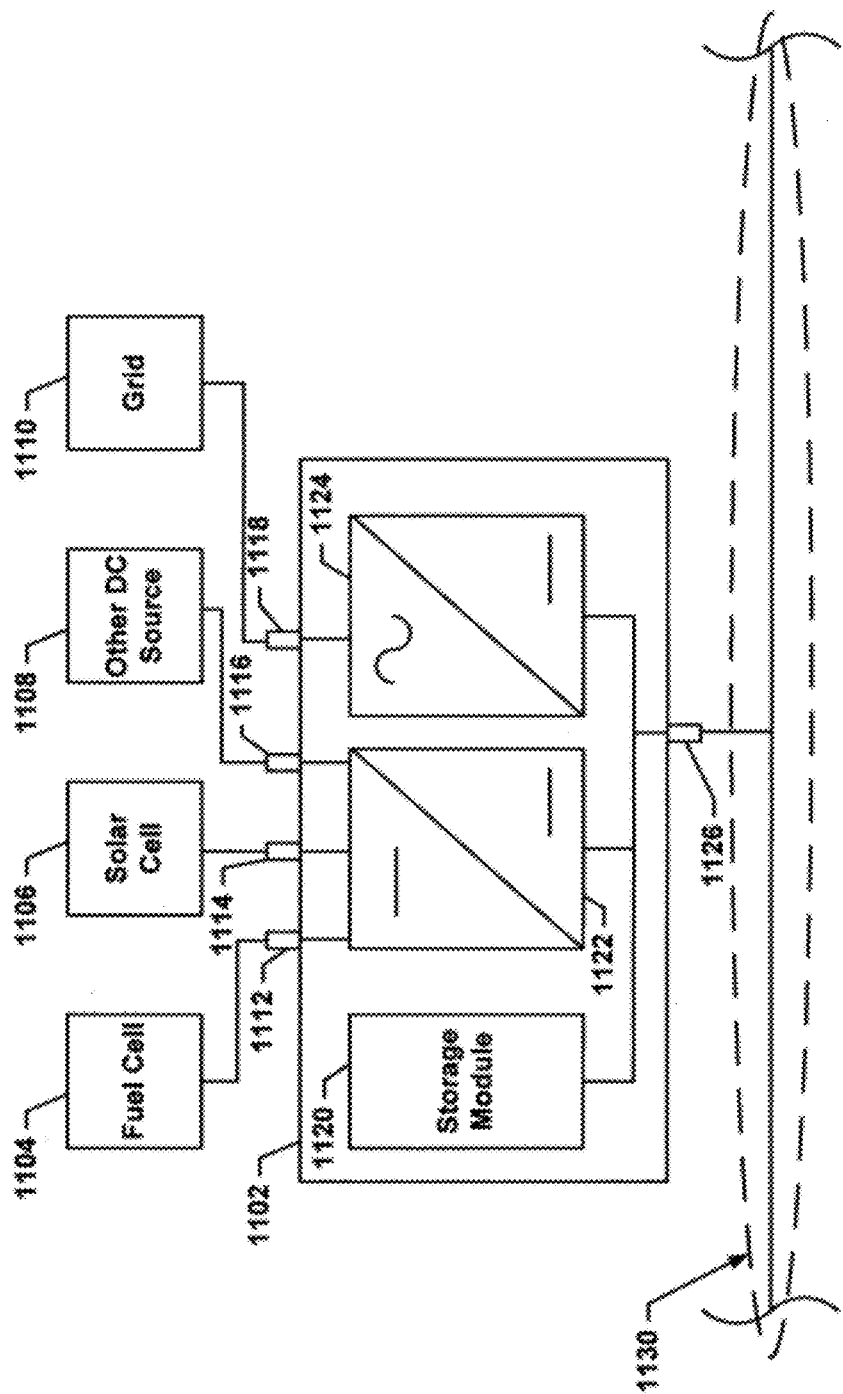
FIG. 11 is a block diagram of an embodiment high reliability DC module.

FIG. 11 illustrates an embodiment high reliability direct current (DC) module 1102. In an embodiment, a high reliability DC module 1102 may be part of a DC micro-grid, such as DC micro-grids 700, 800, and/or 900 discussed above. In an embodiment, high reliability DC module 1102 may receive inputs from various sources, including DC inputs from a fuel cell (e.g., power module having plural fuel cell stacks or segments) 1104, solar cell (e.g., one or more photovoltaic modules) 1106, and/or other DC sources 1108, and AC inputs from a public utility grid 1110. The high reliability DC module 1102 may include DC inputs 1112, 1114, and 1116 which may receive DC from the fuel cell 1104, solar cell 1106, and/or other DC sources 1108, respectively. DC inputs 1112, 1114, and 1116 may be coupled to a DC/DC converter 1122. The high reliability DC module 1102 may include an AC input 1118 which may receive AC from the public utility grid 1110. The AC input 1118 may be coupled to an AC/DC converter 1124. The outputs of the DC/DC converter 1122 and the AC/DC converter 1124 may be couple to a storage module 1120 and a DC output 1126. The storage module 1120 may be one or more storage device, such as a battery or ultracapacitor. The storage module 1120 may receive DC input from the DC/DC converter 1122 and the AC/DC converter 1124 to store energy and may output to DC to the DC output 1126. In an embodiment the DC output 1126 of the high reliability DC module 1102 may be coupled to a common DC bus 1130 which may be similar to common DC buses 738, 802, and/or 1024 discussed above. In this manner, the high reliability DC module 1102 may be high reliability because multiple energy sources are always available to output DC from the DC output 1126.

Figure 12:
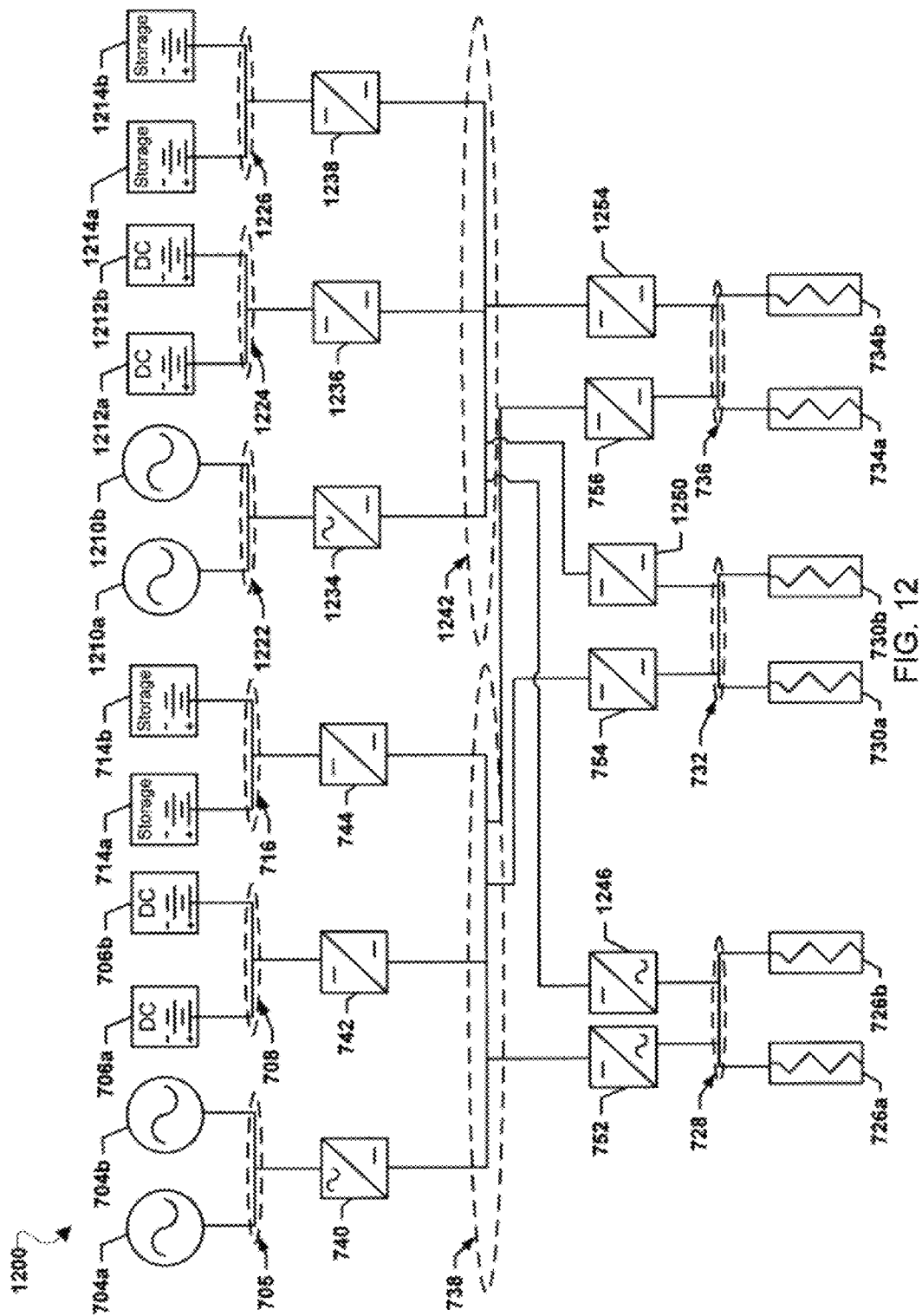
FIG. 12 is a block diagram of a DC micro-grid according to an embodiment.

FIG. 12 illustrates an embodiment direct current (DC) micro-grid 1200. The DC micro-grid 1200 is similar to the DC micro-grid 700 illustrated in FIG. 7 and contains a number of components in common. Those components which are common to both DC micro-grids 700 and 1200 are numbered with the same numbers in FIGS. 7 and 12 and will not be described further.

One difference between the DC micro-girds 1200 and 700 is that in DC micro-grid 1200 the load buses 728, 732, and 736 may be fed by two independent common DC buses 738 and 1242. While discussed in terms of two independent common DC buses 738 and 1242, more than two independent DC buses may feed load buses 728, 732, and 736. Independent common DC buses 738 and 1242 may be coupled to separate power generators 704a, 704b, 706a, 706b, 1210a, 1210b, 1212a, and 1212b and/or separate energy storage devices 714a, 714b, 1214a, and 1214b. In a manner similar to that discussed above with reference to power generators 704a and 704b, AC power generators 1210a and 1210b may be coupled to power generation bus 1222 and power electronics device 1234. In a manner similar to that discussed above with reference to power generators 706a and 706b, DC power generators 1212a and 1212b may be coupled to power generation bus 1224 and power electronics device 1236. In a manner similar to that discussed above with reference to energy storage devices 714a and 714b, energy storage devices 1214a and 1214b may be coupled to storage bus 1226 and power electronics device 1238. Power electronics devices 1234, 1236, and 1238 may be similar to power electronics devices 740, 742, and 744 discussed above. Power electronics devices 1234, 1236, and 1238 may be coupled to common DC bus 1242. Power electronics devices 1246, 1250, and 1254 may be similar to power electronics devices 752, 754, and 756 discussed above, and may couple the common DC bus 1242 to load buses 728, 732, and 736, respectively. The second set of power electronics devices 1246, 1250, and 1254 may be added in parallel to load buses 728, 732, and 736 respectively. In this manner, a second set of power electronics devices 1246, 1250, and 1254 may be coupled to a second common DC bus 1248 which may be coupled to a second set of power generators 1210a, 1210b, 1212a, 1212b and a second set of energy storage devices 1214a, 1214b. The presence of independent common DC buses 738 and 1242 may improve the reliability of power provided to the loads 726a, 726b, 730a, 730b, 734a, and 734b. In this manner, if necessary power for the load buses 728, 754, and 756 cannot be provided by one common DC bus the other common DC bus may be able to meet the power demands. In an embodiment, common DC buses 738 and 1242 may be split buses, similar to common DC bus 802 described above with reference to FIG. 8.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A Direct Current (DC) micro-grid, comprising:
   at least one power generator coupled to at least one power generation bus;
   at least one energy storage device coupled to at least one energy storage bus;
   at least one load coupled to at least one load bus;
   a common DC bus;
   a first power electronics device configured to provide power transfer coupling the at least one power generation bus to the common DC bus;
   a second power electronics device configured to provide power transfer coupling the at least one energy storage bus to the common DC bus;
   a third power electronics device configured to provide power transfer coupling the at least one load bus to the common DC bus;
   a second power generator coupled to a second power generation bus;
   a second energy storage device coupled to a second energy storage bus;
   a second common DC bus;
   a fourth power electronics device configured to provide power transfer coupling the second power generation bus to the second common DC bus;
   a fifth power electronics device configured to provide power transfer coupling the second energy storage bus to the second common DC bus; and
   a sixth power electronics device configured to provide power transfer coupling the at least one load bus to the second common DC bus.

2. The DC micro-grid of claim 1, wherein:
   the at least one power generator is a plurality of power generators;
   the at least one energy storage device is a plurality of energy storage devices;
   the at least one load is a plurality of loads; and
   the plurality of power generators, plurality of energy storage devices, and plurality of loads are grouped by voltage and waveform.

3. The DC micro-grid of claim 2, wherein the groupings of voltage and waveform are one or more of 380 volts DC, 480 volts alternating current (AC), 48 volts DC, and −48 volts DC.

4. The DC micro-grid of claim 1, further comprising:
   a controller coupled to the common DC bus and configured to control operation of the DC micro-grid such that a power requirement of the at least one load is maintained according to the following:

i. $P(\text{to storages}) = P(\text{generators}) - P(\text{loads})$, if $P(\text{generators}) > P(\text{loads})$; or ii. $P(\text{from storages}) = P(\text{loads}) - P(\text{generators})$, if $P(\text{generators}) < P(\text{loads})$, where P is Power.

5. The DC micro-grid of claim 4, wherein the controller is further configured to control the operation of the DC micro-grid such that the voltage of the common DC bus is equal to a highest voltage selected from the at least one power generation bus, at least one energy storage bus, and at least one load bus.

6. The DC micro-grid of claim 4, wherein the controller is further configured to control the operation of the DC micro-grid such that the voltage of the common DC bus is equal to a most common of the voltages among the at least one power generation bus, at least one energy storage bus, and at least one load bus.

7. The DC micro-grid of claim 4, wherein the controller is further configured to control the operation of the DC micro-grid such that the voltage of the common DC bus is equal to −48 volts DC.

8. The DC micro-grid of claim 4, wherein the controller is further configured to control the operation of the DC micro-grid such that the voltage of the common DC bus is less than 380 volts DC, the DC micro-grid further comprising:
   a DC/DC converter within the at least one power generator, wherein the DC/DC converter is configured to provide voltage above the voltage of the common DC bus to auxiliary devices within the at least one power generator.

9. The DC micro-grid of claim 4, wherein the controller acts as a scheduler for the DC micro-grid and is further configured to coordinate the operation of the at least one power generator, at least one energy storage device, and the at least one load.

10. The DC micro-grid of claim 4, wherein the at least one power generator is a fuel cell generator.

11. The DC micro-grid of claim 1, wherein the common DC bus is split bus.

12. The DC micro-grid of claim 11, wherein the split bus has a first conductor of +380 volts DC, a second conductor that is neutral, and a third conductor of −380 volts DC.

13. The DC micro-grid of claim 1, wherein the at least one power generator is one or more of a fuel cell, modular energy generation system, solar cell, microturbine, wind turbine, utility power grid, and distributed diesel generator.

14. The DC micro-grid of claim 1, wherein the at least one load is one or more of an information technology (IT) load, a medical device load, and electric vehicle load.

15. The DC micro-grid of claim 1, wherein the at least on energy storage device is one or more of batteries, ultracapacitors, and flywheels.

16. The DC micro-grid of claim 1, wherein one or more of the first power electronics device, second power electronics device, and third power electronics device comprise isolated devices.

17. The DC micro-grid of claim 16, wherein the one or more of the first power electronics device, second power electronics device, and third power electronics device are selected from one of a full bridge DC/DC converter, half bridge DC/DC converter, resonant DC/DC converter, or hexaformer inverter.

18. The DC micro-grid of claim 16, wherein:
   isolation is provided at least at one point between the at least one power generator and at least one energy storage device and the at least one load; and
   the at least one load is an information technology (IT) load.

19. The DC micro-grid of claim 1, wherein:
   the at least one power generation bus is an alternating current (AC) bus; and
   the first power electronics device is a high efficiency isolation transformer.

20. The DC micro-grid of claim 19, wherein the high efficiency isolation transformer is a hexaformer.

21. The DC micro-grid of claim 1, wherein the first power electronics device, the second power electronics device, and the third power electronics device are configured to connect or disconnect from the common DC bus in response to communication signals received via wired communication links or the common DC bus.

22. The DC micro-grid of claim 21, wherein the communication signals are synchronization signals.

23. The DC micro-grid of claim 21, wherein the communication signals are alarm signals.

24. The DC micro-grid of claim 21, wherein the communication signals are encrypted and include an authentication key.

25. A Direct Current (DC) micro-grid, comprising:
at least one power generator coupled to at least one power generation bus;
at least one energy storage device coupled to at least one energy storage bus;
at least one load coupled to at least one load bus;
a common DC bus;
a first power electronics device configured to provide power transfer coupling the at least one power generation bus to the common DC bus;
a second power electronics device configured to provide power transfer coupling the at least one energy storage bus to the common DC bus; and
a third power electronics device configured to provide power transfer coupling the at least one load bus to the common DC bus;
wherein the at least one power generator comprises a plurality of DC generators and the at least one energy storage device comprises:
an alternating current (AC) input coupled to an AC/DC converter;
an output of the AC/DC converter coupled to the power generation bus;
a storage device;
a charge module coupled to the output of the AC/DC converter and the storage device, the charge module configured to control charging of the storage device; and
a discharge module coupled to the storage device and the output of the AC/DC converter, the discharge module configured to control discharge of energy from the storage device.

26. The DC micro-grid of claim 25, wherein:
the storage device is a battery, ultracapacitor, or flywheel; and
the output of the AC/DC converter is + or −380 volts DC.

27. A method for operating a direct current (DC) micro-grid, comprising:
providing at least one power generator to a power generation bus;
providing at least one energy storage device to an energy storage bus;
providing at least one load to a load bus;
providing the power generation bus, the energy storage bus, and the load bus to a common DC bus, wherein each of the power generation bus, the energy storage bus, and the load bus, respectively, are coupled to the common DC bus via a respective power electronics device;
operating the DC micro-grid such that a power requirement of the at least one load is maintained according to a following:

$P(\text{to storages})=P(\text{generators})-P(\text{loads})$, if $P(\text{generators})>P(\text{loads})$; or    i.

$P(\text{from storages})=P(\text{loads})-P(\text{generators})$, if $P(\text{generators})<P(\text{loads})$,    ii.

where P is Power; and
operating a second independent common DC bus coupled to the at least one load to provide alternative power to the at least one load.

28. The method of claim 27, further comprising:
controlling the voltage of the common DC bus to match a highest voltage of the power generation bus, energy storage bus, or load bus.

29. The method of claim 27, further comprising:
controlling the voltage of the common DC bus to match a most common of the voltages among the power generation bus, energy storage bus, and load bus.

30. The method of claim 27, wherein the common DC bus is a split bus.

31. The method of claim 30, wherein the split bus comprises a +380 volt DC conductor, a −380 volt DC conductor, and a neutral conductor.

32. The method of claim 27, wherein the at least one power generator is selected from one or more of a fuel cell, modular energy generation system, solar cell, microturbine, wind turbine, utility power grid, or distributed diesel generator.

33. The method of claim 27, wherein the power electronics devices are fully isolated devices.

34. The method of claim 33, wherein the power electronics devices individually comprise one or more of a full bridge DC/DC converter, half bridge DC/DC converter, resonant DC/DC converter, or AC/DC hexaformer inverter.

35. The method of claim 27, wherein isolation is provided by the power electronics devices at least at one point between the at least one power generator and the at least one energy storage device and the at least one load.

36. The method of claim 27, further comprising:
controlling the voltage of the common DC bus to be less than 380 volts DC; and
providing higher voltage than 380 volts DC for auxiliary devices with the at least one power generator using DC/DC converters located within the at least one power generator.

37. The method of claim 27, wherein an input or output to the common DC bus is an alternating current (AC) bus, and the method further comprising:
coupling an isolation transformer between the DC bus and the AC bus to provide isolation.

38. The method of claim 37, wherein the isolation transformer is a hexaformer.

39. The method of claim 27, further comprising:
communicating between the at least one power generator, the at least one energy storage device, and the at least one load.

40. The method of claim 39, wherein the communicating is performed using wires run in parallel to the inputs and outputs from the common DC bus.

41. The method of claim 40, wherein the wires are electrical wires or fiber optic transmission lines.

42. The method of claim 39, wherein the communication is performed by injecting signals into the common DC bus.

43. The method of claim 42, wherein the power electronics devices are configured to filter the injected signals such that the injected signals do not affect a power quality of their respective power generation bus, energy storage bus, and load bus.

44. The method of claim 42, wherein the power electronics devices are configured to disconnect from the common bus in response to a trigger.

45. The method of claim 44, wherein the trigger is a loss of synchronization with the signal.

46. The method of claim 44, wherein the trigger is an alarm event.

47. The method of claim 42, further comprising:
optimizing a power output of the at least one power generator or the at least one energy storage device based on communication signals sent in response to predicted transients in power requirements of the at least one load.

48. The method of claim 42, wherein communicating between the at least one power generator, the at least one energy storage device, and the at least one load includes using encryption and authentication keys.

49. The method of claim 42, further comprising a scheduler in communication with the at least one power generator, the at least one energy storage device, the at least one load, the common DC bus, and the power electronics devices, wherein the scheduler controls the operation of the at least one power generator, the at least one energy storage device, the at least one load, the common DC bus, and the power electronics devices.

50. The method of claim 49, wherein the scheduler controls the operation of the at least one power generator to coordinate load steps, coordinate warm up times, optimize efficiency, coordinate fuel supplies, or manage a cost of power generation.

51. The method of claim 49, wherein the scheduler controls the operation of the at least one energy storage device to manage a state of charge, manage a cost of power generation, or manage round trip efficiency.

52. The method of claim 49, wherein the scheduler controls the operation of the at least one load to manage at least one of load start up, load shut down, and load criticality.

53. The method of claim 49, wherein the scheduler dispatches fuel to storage in response to performance outages in the at least one power generator or dispatches fuel from storage in response to low fuel supply indications from the at least one power generator.

54. The method of claim 27, wherein:
the at least one power generator is a plurality of power generators;
the at least one energy storage device is a plurality of energy storage devices; and
the at least one load is a plurality of loads;
the method further comprising:
grouping the plurality of power generators, the plurality of energy storage devices, and the plurality of loads by voltage and waveform.

55. The method of claim 54, wherein the groupings voltage and waveform are one or more of 380 volts DC, 480 volts alternating current (AC), +48 volts DC, or −48 volts DC.

56. A method for operating a direct current (DC) micro-grid, comprising:
providing at least one power generator to a power generation bus;
providing at least one energy storage device to an energy storage bus;
providing at least one load to a load bus;
providing the power generation bus, the energy storage bus, and the load bus to a common DC bus, wherein each of the power generation bus, the energy storage bus, and the load bus, respectively, are coupled to the common DC bus via a respective power electronics device;
operating the DC micro-grid such that a power requirement of the at least one load is maintained according to a following:

$$P(\text{to storages}) = P(\text{generators}) - P(\text{loads}), \text{ if } P(\text{generators}) > P(\text{loads}); \text{ or} \qquad \text{i.}$$

$$P(\text{from storages}) = P(\text{loads}) - P(\text{generators}), \text{ if } P(\text{generators}) < P(\text{loads}), \qquad \text{ii.}$$

where P is Power; and
communicating between the at least one power generator, the at least one energy storage device, and the at least one load;
wherein the communication is performed by injecting signals into the common DC bus; and
wherein communicating between the at least one power generator, the at least one energy storage device, and the at least one load includes using a digital addressing scheme and frequency or amplitude modulation for addressing.

* * * * *